(12) United States Patent
Kanzaki et al.

(10) Patent No.: US 12,297,913 B2
(45) Date of Patent: May 13, 2025

(54) FLUID CONTROL VALVE

(71) Applicant: EAGLE INDUSTRY CO., LTD., Tokyo (JP)

(72) Inventors: Toshinori Kanzaki, Tokyo (JP); Wataru Takahashi, Tokyo (JP); Masahiro Hayama, Tokyo (JP); Kohei Fukudome, Tokyo (JP); Keigo Shirafuji, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/019,066

(22) PCT Filed: Jul. 27, 2021

(86) PCT No.: PCT/JP2021/027767
§ 371 (c)(1),
(2) Date: Jan. 31, 2023

(87) PCT Pub. No.: WO2022/030312
PCT Pub. Date: Feb. 10, 2022

(65) Prior Publication Data
US 2023/0296178 A1    Sep. 21, 2023

(30) Foreign Application Priority Data
Aug. 4, 2020    (JP) ................................. 2020-132385

(51) Int. Cl.
*F16K 1/42*    (2006.01)
*F16K 1/36*    (2006.01)

(52) U.S. Cl.
CPC . *F16K 1/42* (2013.01); *F16K 1/36* (2013.01)

(58) Field of Classification Search
CPC ..................................... F16K 1/36; F16K 1/42
See application file for complete search history.

(56) References Cited

U.S. PATENT DOCUMENTS

| | | | |
|---|---|---|---|
| 813,555 A | 2/1906 | Hayden | F16K 1/34 |
| 821,758 A | 5/1906 | Smith | F16K 1/46 |

(Continued)

FOREIGN PATENT DOCUMENTS

| | | | |
|---|---|---|---|
| CN | 103492773 | 1/2014 | F16K 1/38 |
| CN | 104520155 | 4/2015 | B60T 8/36 |

(Continued)

OTHER PUBLICATIONS

International Search Report and Written Opinion and International Preliminary Report on Patentability issued in PCT/JP2021/027769, dated Sep. 7, 2021, 24 pages.

(Continued)

*Primary Examiner* — Daphne M Barry
(74) *Attorney, Agent, or Firm* — HAYES SOLOWAY P.C.

(57) ABSTRACT

A valve includes a valve housing provided with an inlet port and an outlet port; a valve body to be driven by a drive source; a spring that urges the valve body in a direction opposite a direction of driving by the drive source; and a valve seat formed at an edge of a through-flow passage. The valve body and the valve seat cooperatively form a poppet valve. The valve is configured to control a flow rate in accordance with a movement of the valve body. Flow passages on a downstream side of the poppet valve are provided with increase regions where a flow passage cross-sectional area tends to increase toward the downstream side.

8 Claims, 8 Drawing Sheets

(56) References Cited

U.S. PATENT DOCUMENTS

| | | | |
|---|---|---|---|
| 877,865 A | 1/1908 | Ricksecker | F16K 1/34 |
| 1,449,876 A | 3/1923 | Erastus | F01L 3/20 |
| 1,614,002 A | 1/1927 | Horton | A62C 35/605 |
| 1,758,471 A | 5/1930 | Julius | F16K 1/46 |
| 1,800,127 A | 4/1931 | Wilson | F16K 1/34 |
| 1,847,385 A | 3/1932 | Franklin | F16K 1/34 |
| 2,196,798 A | 4/1940 | Otto | F16K 1/36 |
| 2,267,515 A | 12/1941 | Wilcox | F16K 31/0627 |
| 2,331,503 A | 10/1943 | Ray | F16K 41/10 |
| 2,797,061 A | 6/1957 | Buchanan | F16K 31/06 |
| 2,887,293 A | 5/1959 | Fred | F16K 31/60 |
| 2,893,685 A | 7/1959 | Camp | F16K 1/36 |
| 2,898,082 A | 8/1959 | Von Almen | F04B 51/1027 |
| 3,049,332 A | 8/1962 | Webster | F16K 1/02 |
| 3,054,422 A | 9/1962 | Napolitano | F16K 1/385 |
| 3,070,120 A | 12/1962 | Wendt | F16K 1/46 |
| 3,185,438 A | 5/1965 | Smirra | F16K 1/34 |
| 3,204,925 A | 9/1965 | Enrico | F16K 1/50 |
| 3,230,973 A | 1/1966 | Rudolf | F16K 1/46 |
| 3,278,156 A | 10/1966 | Callahan | F16K 41/10 |
| 3,360,304 A | 12/1967 | Adams | B61K 7/12 |
| 3,394,732 A | 7/1968 | Constantine | F16K 1/36 |
| 3,426,741 A | 2/1969 | Haagen | F01L 3/02 |
| 3,483,888 A | 12/1969 | Hugo | F16K 15/046 |
| 3,623,699 A | 11/1971 | Matousek | F16K 1/46 |
| 3,627,257 A | 12/1971 | Stamfil | F16K 31/0693 |
| 3,679,169 A | 7/1972 | Bedo | F16K 41/02 |
| 3,854,495 A | 12/1974 | Cowley | G05D 16/0663 |
| 4,085,921 A | 4/1978 | Ueda et al. | F16K 31/06 |
| 4,149,699 A | 4/1979 | Speckmann | F16K 41/00 |
| 4,318,532 A | 3/1982 | Winkler | F16K 1/34 |
| 4,345,739 A | 8/1982 | Wheatley | F16K 1/2263 |
| 4,364,615 A | 12/1982 | Euler | F16C 27/04 |
| 4,417,601 A | 11/1983 | Bennett | A62C 31/12 |
| 4,448,038 A | 5/1984 | Barbier | F25B 41/34 |
| 4,474,356 A | 10/1984 | Baumann | F16K 1/12 |
| 4,579,145 A | 4/1986 | Leiber | F16H 61/0251 |
| 4,615,358 A | 10/1986 | Hammond | F15B 13/0402 |
| 4,617,889 A | 10/1986 | Nishimiya | F02D 31/00 |
| 4,632,358 A | 12/1986 | Orth | F25B 41/347 |
| 4,778,150 A | 10/1988 | Pratt | F16K 41/043 |
| 4,825,909 A | 5/1989 | Martin | F15B 13/02 |
| 4,848,729 A | 7/1989 | Danzy | F16K 1/46 |
| 4,895,192 A | 1/1990 | Mortenson | F01M 11/04 |
| 4,915,355 A | 4/1990 | Fort | F16K 1/46 |
| 4,917,150 A | 4/1990 | Koch | F16K 31/0606 |
| 4,922,957 A | 5/1990 | Johnson | F16K 1/46 |
| 4,923,173 A | 5/1990 | Szymaszek | F16K 1/36 |
| 4,979,542 A | 12/1990 | Mesenich | F02M 47/027 |
| 4,998,559 A | 3/1991 | McAuliffe | F16H 61/0251 |
| 5,011,116 A | 4/1991 | Alberts | F16K 47/00 |
| 5,060,695 A | 10/1991 | McCabe | G05D 16/2024 |
| 5,217,047 A | 6/1993 | McCabe | F16H 16/0251 |
| 5,232,195 A | 8/1993 | Torrielli | H01F 7/1607 |
| 5,246,205 A | 9/1993 | Gillingham | F01N 3/0212 |
| 5,263,694 A | 11/1993 | Smith | B60G 15/068 |
| 5,364,066 A | 11/1994 | Dorste | F25B 41/35 |
| 5,409,036 A | 4/1995 | Ahmadian | H01F 7/14 |
| 5,439,027 A | 8/1995 | Layton | F16K 1/385 |
| 5,702,235 A | 12/1997 | Hirota | F04B 27/1804 |
| 5,778,932 A | 7/1998 | Alexander | G05D 16/2024 |
| 6,010,312 A | 1/2000 | Suitou | F04B 27/1804 |
| 6,019,118 A | 2/2000 | Voggenreiter et al. F16K 51/02 | |
| 6,155,391 A | 12/2000 | Kashiwagi et al. | F16F 9/348 |
| 6,161,585 A | 12/2000 | Kolchinsky | F05D 16/2024 |
| 6,257,836 B1 | 7/2001 | Ota et al. | 417/222.02 |
| 6,315,266 B1 | 11/2001 | Hirota | F16K 31/406 |
| 6,321,995 B1 | 11/2001 | Badovick | F25B 41/335 |
| 6,361,283 B1 | 3/2002 | Ota | F04B 27/1084 |
| 6,443,420 B1 | 9/2002 | Hettinger | F16K 31/02 |
| 6,481,976 B2 | 11/2002 | Kimura | F04B 27/1804 |
| 6,626,000 B1 | 9/2003 | Meyer | F25B 41/345 |
| 6,776,182 B2 | 8/2004 | Ishitoya | F16K 25/00 |
| 6,811,140 B1 | 11/2004 | Maini | F16K 1/46 |
| 6,840,504 B2 | 1/2005 | Hagiwara | F16K 1/36 |
| 6,959,718 B2 | 11/2005 | Kayahara | F16K 31/0655 |
| 7,007,917 B2 | 3/2006 | Choi | F16K 31/0655 |
| 7,040,595 B2 | 5/2006 | Hirota | F16K 31/02 |
| 7,481,417 B2 | 1/2009 | Mayer | F16K 51/02 |
| 7,533,687 B2 | 5/2009 | Uemura | F16K 27/048 |
| 7,726,949 B2 | 6/2010 | Taguchi | F04B 1/26 |
| 7,758,014 B2 | 7/2010 | Lancaster | F16K 1/04 |
| 7,832,653 B2 | 11/2010 | Yukimoto | F25B 41/39 |
| 7,958,908 B2 | 6/2011 | Cho et al. | F15B 13/044 |
| 7,971,797 B2 | 7/2011 | Habermann | F16K 31/002 |
| 8,021,124 B2 | 9/2011 | Umemura | F04B 27/1804 |
| 8,079,827 B2 | 12/2011 | Iwa | F04B 27/1804 |
| 8,128,061 B2 | 3/2012 | Uemura | F04B 27/1804 |
| 8,225,818 B1 | 7/2012 | Stephens | F15B 13/0442 |
| 8,328,163 B2 | 12/2012 | Boesch | F16K 1/36 |
| 8,387,947 B2 | 3/2013 | Uemura | F04B 27/1804 |
| 8,469,337 B1 | 6/2013 | Hoeptner | F16K 1/36 |
| 8,579,257 B2 | 11/2013 | Taylor | F16K 1/46 |
| 8,651,826 B2 | 2/2014 | Futakuchi | F04B 27/1804 |
| 8,684,037 B2 | 4/2014 | Huynh | F15B 13/01 |
| 8,757,592 B2 | 6/2014 | Marica | F16K 31/00 |
| 9,022,346 B2 | 5/2015 | Najmolhoda | F16K 31/0613 |
| 9,027,598 B2 | 5/2015 | Schneider | F16K 31/0613 |
| 9,132,714 B2 | 9/2015 | Futakuchi | F04B 27/1804 |
| 9,243,733 B2 | 1/2016 | Lively | G05D 16/02 |
| 9,297,373 B2 | 3/2016 | Bagagli | F16K 15/026 |
| 9,383,021 B2 | 7/2016 | Kosmehl | F16K 1/36 |
| 9,400,027 B2 | 7/2016 | Imaizumi | F16F 1/32 |
| 9,453,518 B2 | 9/2016 | Schulz | F15B 13/043 |
| 9,470,337 B2 | 10/2016 | Roper | F16K 1/36 |
| 9,581,149 B2 | 2/2017 | Ota et al. | F04B 27/1804 |
| 9,581,150 B2 | 2/2017 | Ota et al. | F04B 27/1804 |
| 9,638,082 B2 | 5/2017 | Fujita | F16K 25/00 |
| 9,732,874 B2 | 8/2017 | Saeki | F16K 31/0603 |
| 9,874,286 B2 | 1/2018 | Bagagli | F16K 15/12 |
| 10,113,539 B2 | 10/2018 | Sugamura | F04B 27/1804 |
| 10,378,657 B2 | 8/2019 | Lin | F16K 1/46 |
| 10,519,944 B2 | 12/2019 | Taguchi | F04B 27/1804 |
| 10,557,463 B2 | 2/2020 | Sugamura | F04B 27/1804 |
| 10,690,125 B2 | 6/2020 | Hayama | F04B 27/18 |
| 10,784,804 B2 | 9/2020 | Sasaki | H02P 25/022 |
| 10,837,431 B2 | 11/2020 | Tonegawa | F04B 49/22 |
| 11,085,431 B2 | 8/2021 | Fukudome et al. | F16K 31/06 |
| 11,092,244 B1 | 8/2021 | Hu | F16K 1/36 |
| 11,480,166 B2 | 10/2022 | Hayama | F04B 27/10 |
| 2001/0003573 A1 | 6/2001 | Kimura et al. | 417/222.2 |
| 2002/0134444 A1 | 9/2002 | Isobe | F16K 27/041 |
| 2003/0145615 A1 | 8/2003 | Sasaki | F16K 31/0637 |
| 2003/0197141 A1 | 10/2003 | Kajitani | F16L 47/00 |
| 2003/0202885 A1 | 10/2003 | Taguchi | F04B 49/00 |
| 2004/0045305 A1 | 3/2004 | Murase | F25B 49/022 |
| 2004/0165994 A1 | 8/2004 | Umemura | F04B 27/1804 |
| 2005/0076959 A1 | 4/2005 | Yamamoto | F16K 31/0624 |
| 2005/0151310 A1 | 7/2005 | Rodeffer | F16F 1/32 |
| 2005/0163624 A1 | 7/2005 | Taguchi | F04B 27/1804 |
| 2007/0214814 A1 | 9/2007 | Umemura et al. | |
| 2007/0264134 A1 | 11/2007 | Hirota | F04B 27/1804 |
| 2008/0138213 A1 | 6/2008 | Umemura et al. | 417/222.2 |
| 2008/0175727 A1 | 7/2008 | Umemura et al. | F04B 49/22 |
| 2009/0108221 A1 | 4/2009 | Umemura et al. | 251/129.15 |
| 2009/0114871 A1 | 5/2009 | Iwa | F04B 27/14 |
| 2009/0183786 A1 | 7/2009 | Iwa | 137/487.5 |
| 2009/0256091 A1 | 10/2009 | Nordstrom | F16K 31/0613 |
| 2010/0019406 A1 | 1/2010 | Shoji et al. | F16K 1/34 |
| 2010/0051838 A1 | 3/2010 | Uemura | F04B 27/1804 |
| 2010/0252763 A1* | 10/2010 | Courth | F16K 31/0665 251/129.15 |
| 2010/0282991 A1 | 11/2010 | Okamoto | F16K 31/02 |
| 2011/0041941 A1 | 2/2011 | Sonsterod | F16K 15/14 |
| 2011/0061749 A1 | 3/2011 | Okamoto | F16K 31/0655 |
| 2011/0089352 A1 | 4/2011 | Morgan | F16K 11/0716 |
| 2011/0203888 A1 | 8/2011 | Sonsterod | F16F 9/32 |
| 2012/0056113 A1 | 3/2012 | Tano | F04B 27/1804 |
| 2012/0097881 A1 | 4/2012 | Aoyama | F16K 1/425 |
| 2012/0198992 A1 | 8/2012 | Futakuchi et al. | 91/505 |
| 2012/0198993 A1 | 8/2012 | Fukudome | 91/505 |
| 2012/0211686 A1 | 8/2012 | Okamoto | F16K 31/0655 |
| 2013/0291963 A1 | 11/2013 | Futakuchi et al. | 137/487.5 |

(56) References Cited

U.S. PATENT DOCUMENTS

| | | | |
|---|---|---|---|
| 2014/0099214 A1 | 4/2014 | Fukudome | 417/222.2 |
| 2014/0109973 A1 | 4/2014 | Neumeister | C23C 16/4412 |
| 2014/0130916 A1 | 5/2014 | Saeki | F16K 31/0613 |
| 2014/0294632 A1 | 10/2014 | Kondo et al. | 417/434 |
| 2014/0369862 A1 | 12/2014 | Ota et al. | F04B 27/1804 |
| 2015/0004010 A1 | 1/2015 | Saeki | F04B 27/1804 |
| 2015/0021131 A1 | 1/2015 | Wootten | F16F 9/348 |
| 2015/0027573 A1 | 1/2015 | Ochiai | F15B 13/0402 |
| 2015/0044067 A1 | 2/2015 | Ota et al. | F04B 27/1804 |
| 2015/0068628 A1 | 3/2015 | Iwa | 137/625.65 |
| 2015/0104334 A1 | 4/2015 | Ota et al. | F04B 27/1804 |
| 2015/0275874 A1 | 10/2015 | Ota | F04B 27/1804 |
| 2015/0276065 A1 | 10/2015 | Yoshida | F16K 3/246 |
| 2015/0345655 A1 | 12/2015 | Higashidozono | 137/624.27 |
| 2016/0053755 A1 | 2/2016 | Taguchi | F04B 49/22 |
| 2016/0208954 A1 | 7/2016 | Ito et al. | F16K 39/02 |
| 2016/0290326 A1 | 10/2016 | Sugamura | F04B 27/1804 |
| 2017/0261113 A1 | 9/2017 | Sato | F16K 31/0675 |
| 2017/0284562 A1 | 10/2017 | Hayama | F16K 41/00 |
| 2018/0156345 A1 | 6/2018 | Kanda | F15B 13/0431 |
| 2018/0187793 A1 | 7/2018 | Futakuchi | F04B 39/08 |
| 2018/0238455 A1 | 8/2018 | Yazawa | F16K 31/508 |
| 2018/0291888 A1 | 10/2018 | Tonegawa et al. | F04B 49/22 |
| 2018/0372129 A1 | 12/2018 | Kato et al. | F15B 13/04 |
| 2019/0162175 A1 | 5/2019 | Higashidozono | F04B 27/18 |
| 2019/0293061 A1 | 9/2019 | Kume | F16K 11/048 |
| 2020/0011444 A1 | 1/2020 | Morita et al. | F16K 31/06 |
| 2020/0032781 A1 | 1/2020 | Higashidozono | F16K 31/0624 |
| 2020/0088178 A1 | 3/2020 | Fukudome et al. | F16K 31/06 |
| 2020/0173580 A1 | 6/2020 | Sandeck | F16K 51/02 |
| 2020/0309105 A1 | 10/2020 | Hayama et al. | F04B 27/18 |
| 2020/0318624 A1 | 10/2020 | Hayama | F04B 27/18 |
| 2020/0325881 A1 | 10/2020 | Hayama et al. | F04B 27/18 |
| 2020/0332786 A1 | 10/2020 | Hayama | F04B 27/1804 |
| 2020/0362974 A1 | 11/2020 | Hayama et al. | F16K 11/24 |
| 2020/0370545 A1 | 11/2020 | Hayama et al. | F16K 31/06 |
| 2021/0372396 A1 | 12/2021 | Kurihara | G05D 7/0635 |
| 2021/0404570 A1 | 12/2021 | Hayama et al. | F16K 17/04 |
| 2022/0213878 A1 | 7/2022 | Fukudome et al. | F04B 27/18 |

FOREIGN PATENT DOCUMENTS

| | | | |
|---|---|---|---|
| CN | 107339442 | 11/2017 | F16K 1/02 |
| CN | 209146387 | 7/2019 | F16K 31/42 |
| CN | 110260001 | 9/2019 | F16K 15/016 |
| CN | 110735965 | 1/2020 | F16K 1/00 |
| CN | 111279076 | 6/2020 | F04B 27/18 |
| CN | 111316028 | 6/2020 | F16K 31/06 |
| CN | 111417780 | 7/2020 | F04B 27/18 |
| DE | 2414893 | 10/1975 | F16K 15/00 |
| DE | 2706439 | 8/1978 | F16K 11/04 |
| DE | 102006033747 | 1/2008 | F16K 31/00 |
| EP | 0229315 | 7/1987 | F02M 3/07 |
| EP | 1519128 | 3/2005 | F25B 41/06 |
| EP | 2180217 | 4/2010 | F16K 31/06 |
| EP | 2594794 | 5/2013 | F04B 27/14 |
| EP | 3056778 | 8/2016 | F16K 31/04 |
| EP | 3258103 | 12/2017 | F04B 27/18 |
| EP | 3296599 | 3/2018 | F16K 1/34 |
| EP | 3366957 | 8/2018 | F16K 1/34 |
| EP | 3726054 | 10/2020 | F04B 27/18 |
| JP | 5682358 | 7/1981 | G03B 15/00 |
| JP | 5740945 | 8/1982 | B21B 39/14 |
| JP | H04171361 | 6/1992 | F04B 49/00 |
| JP | 5346276 | 12/1993 | F25B 41/96 |
| JP | 626454 | 2/1994 | F04B 27/08 |
| JP | H0711313 | 2/1995 | F16K 1/34 |
| JP | H8159320 | 6/1996 | F16K 31/04 |
| JP | H09144931 | 6/1997 | F16K 31/06 |
| JP | H10220926 | 8/1998 | F25B 41/06 |
| JP | 11287281 | 10/1999 | F16F 9/348 |
| JP | 200020763 | 8/2000 | F16K 31/06 |
| JP | 2000304152 | 11/2000 | F16D 48/02 |
| JP | 2001012534 | 1/2001 | F16F 9/46 |
| JP | 2001501290 | 1/2001 | F16K 31/06 |
| JP | 2001153495 | 6/2001 | F16K 31/06 |
| JP | 2001153498 | 6/2001 | F16K 31/06 |
| JP | 2001165055 | 6/2001 | F04B 27/14 |
| JP | 2001263527 | 9/2001 | F16K 31/06 |
| JP | 2002216803 | 8/2002 | H01M 8/02 |
| JP | 2003004160 | 1/2003 | F16K 31/04 |
| JP | 2003301772 | 10/2003 | |
| JP | 2003314745 | 11/2003 | F16K 51/02 |
| JP | 2003322086 | 11/2003 | F04B 49/00 |
| JP | 2004003468 | 1/2004 | F04B 27/14 |
| JP | 2004101163 | 4/2004 | F25B 41/06 |
| JP | 2005307817 | 11/2005 | F04B 27/14 |
| JP | 2005351605 | 12/2005 | F16K 1/38 |
| JP | 2006153204 | 6/2006 | F16K 31/04 |
| JP | 2007247512 | 9/2007 | F04B 27/14 |
| JP | 2008157031 | 7/2008 | F04B 27/14 |
| JP | 2008190574 | 8/2008 | F16K 31/06 |
| JP | 2009030752 | 2/2009 | F16K 31/06 |
| JP | 2009115204 | 5/2009 | F16K 31/04 |
| JP | 20092211965 | 10/2009 | F04B 27/14 |
| JP | 2009257523 | 11/2009 | F16K 31/06 |
| JP | 2009275550 | 11/2009 | F04B 49/00 |
| JP | 2010019406 | 1/2010 | F16K 31/04 |
| JP | 2011501798 | 1/2011 | F16K 15/14 |
| JP | 2011525962 | 9/2011 | F16F 9/32 |
| JP | 4822735 | 11/2011 | A43B 23/24 |
| JP | 2012144986 | 8/2012 | F04B 27/14 |
| JP | 2012211579 | 11/2012 | F04B 27/14 |
| JP | 2013024135 | 2/2013 | F04B 27/14 |
| JP | 5167121 | 3/2013 | F04B 27/14 |
| JP | 2013100915 | 5/2013 | F15B 31/06 |
| JP | 2013194918 | 9/2013 | F16K 1/36 |
| JP | 2014080927 | 5/2014 | F04B 27/16 |
| JP | 2014092207 | 5/2014 | F16K 31/06 |
| JP | 2014095463 | 5/2014 | F16K 31/06 |
| JP | 2014194180 | 10/2014 | F04B 27/14 |
| JP | 2015075054 | 4/2015 | F04B 27/17 |
| JP | 20151168 | 5/2015 | F04B 27/14 |
| JP | 2015137246 | 7/2015 | F04B 27/14 |
| JP | 2015178795 | 10/2015 | F04B 27/14 |
| JP | 5983539 | 8/2016 | F04B 27/18 |
| JP | 2015196825 | 11/2016 | F04B 27/18 |
| JP | 2016196876 | 11/2016 | F04B 27/18 |
| JP | 2015205404 | 12/2016 | F04B 27/18 |
| JP | 6135521 | 5/2017 | F04B 27/18 |
| JP | 2017089832 | 5/2017 | F16K 31/06 |
| JP | 2017180525 | 10/2017 | F16K 31/04 |
| JP | 2017219060 | 12/2017 | F16K 37/00 |
| JP | 2018015739 | 2/2018 | C02F 1/46 |
| JP | 2018035840 | 5/2018 | |
| JP | 2018115684 | 7/2018 | B60G 17/08 |
| JP | 2018135954 | 8/2018 | F16K 31/06 |
| JP | 2018179087 | 11/2018 | F16K 31/06 |
| JP | 2019002436 | 1/2019 | F16K 3/26 |
| JP | 2019131725 | 8/2019 | |
| JP | 2019138473 | 8/2019 | F16K 1/36 |
| JP | 2019167982 | 10/2019 | F16K 1/38 |
| JP | 2019183960 | 10/2019 | F16K 31/06 |
| JP | 20120041606 | 3/2020 | F16K 1/44 |
| JP | 2020060108 | 4/2020 | F04B 27/18 |
| KR | 20-0400543 | 10/2005 | B60S 1/52 |
| KR | 1020050107244 | 11/2005 | F16K 17/10 |
| KR | 1020080011375 | 2/2008 | F04B 27/14 |
| KR | 102019001499 | 1/2019 | F16K 31/06 |
| WO | WO9218795 | 10/1992 | F16K 1/34 |
| WO | WO2006090760 | 8/2006 | F04B 27/18 |
| WO | WO2007119380 | 10/2007 | F04B 27/14 |
| WO | WO2009025298 | 2/2009 | F16K 31/06 |
| WO | WO2011114841 | 9/2011 | F04B 27/14 |
| WO | WO2011132438 | 10/2011 | F16K 31/06 |
| WO | WO2012077439 | 6/2012 | F04B 27/14 |
| WO | WO2014119594 | 8/2014 | F04B 27/14 |
| WO | WO2014148367 | 9/2014 | F16K 31/06 |
| WO | WO2018124156 | 7/2018 | F16K 31/06 |
| WO | WO2019131482 | 7/2019 | F04B 27/18 |
| WO | WO2020110925 | 11/2019 | F04B 27/18 |

(56) References Cited

FOREIGN PATENT DOCUMENTS

| WO | WO2020013169 | 1/2020 | ............. F04B 27/18 |
| WO | WO2020218284 | 10/2020 | ............. F04B 27/18 |

OTHER PUBLICATIONS

International Search Report and Written Opinion and International Preliminary Report on Patentability issued in PCT/JP2021/027762, dated Oct. 5, 2021, 20 pages.
International Search Report and Written Opinion and International Preliminary Report on Patentability issued in PCT/JP2021/027766, dated Sep. 7, 2021, 24 pages.
International Search Report and Written Opinion and International Preliminary Report on Patentability issued in PCT/JP2021/027770, dated Oct. 5, 2021, 20 pages.
International Search Report and Written Opinion and International Preliminary Report on Patentability issued in PCT/JP2021/027772, dated Sep. 21, 2021, 24 pages.
International Search Report and Written Opinion and International Preliminary Report on Patentability issued in PCT/JP2021/027767, dated Sep. 7, 2021, 22 pages.
International Search Report and Written Opinion and International Preliminary Report on Patentability issued in PCT/JP2021/030007, dated Nov. 2, 2021, 18 pages.
International Search Report and Written Opinion and International Preliminary Report on Patentability issued in PCT/JP2021/034996, dated Dec. 12, 2021, 18 pages.
International Search Report and Written Opinion and International Preliminary Report on Patentability issued in PCT/JP2021/034990, dated Oct. 19, 2021, 18 pages.
International Search Report and Written Opinion and International Preliminary Report on Patentability issued in PCT/JP2021/034995, dated Dec. 14, 2021, 16 pages.
International Search Report and Written Opinion and International Preliminary Report on Patentability issued in PCT/JP2021/012340, dated May 31, 2022, 24 pages.
Official Action issued in European related Application Serial No. 21853139.0, dated Mar. 22, 2024, 15 pages.
Official Action issued in European related Application Serial No. 21852577.2, dated Mar. 22, 2024, 9 pages.
Official Action issued in European related Application Serial No. 21853892.4, dated Mar. 22, 2024, 8 pages.
Official Action issued in U.S. Appl. No. 18/019,230, dated Apr. 25, 2024, 11 pages.
Official Action issued in U.S. Appl. No. 18/029,065, dated Apr. 23, 2024, 14 pages.
Official Action issued in U.S. Appl. No. 18/017,825, dated Apr. 15, 2024, 15 pages.
Official Action issued in U.S. Appl. No. 18/017,824, dated Mar. 13, 2024, 19 pages.
Official Action issued in U.S. Appl. No. 18/019,060, dated Apr. 26, 2024, 6 pages.
Official Action issued in European related Application Serial No. 21854468.2, dated Jul. 24, 2024, 7 pages.
Official Action issued in European related Application Serial No. 91853973.2, dated Jul. 25, 2024, 7 pages.
Official Action issued in European related Application Serial No. 21853972.4, dated Jul. 24, 2024, 8 pages.
Official Action issued in European related Application Serial No. 21872539.8, dated Sep. 3, 2024, 5 pages.
Official Action issued in European related Application Serial No. 21875395.2, dated Sep. 13, 2024, 7 pages.
Search Report issued in European related Application Serial No. 21906416.9, dated Oct. 22, 2024, 8 pages.
Official Action issued in Japanese related Application Serial No. 2022-541458, dated Oct. 15, 2024, 6 pages with English Translation.
Official Action issued in Korean related Application Serial No. 10-2023-7004906, dated Jun. 17, 2024, 10 pages with English Translation.
Official Action issued in Korean related Application Serial No. 10-2023-7004905, dated Jun. 17, 2024, 10 pages with English Translation.
Official Action issued in Korean related Application Serial No. 10-2023-7011145, dated Jun. 18, 2024, 6 pages with English Translation.
Official Action issued in Korean related Application Serial No. 10-2023-7004093, dated Jun. 17, 2024, 11 pages with English Translation.
Official Action issued in Korean related Application Serial No. 10-2023-7020969, dated Jun. 21, 2024, 8 pages with English Translation.
Offical Action issued in related U.S. Appl. No. 18/027,599, dated Jun. 13, 2024, 16 pages.
Official action issued in related U.S. Appl. No. 18/029,065, dated Aug. 6, 2024, 10 pages.
Official action issued in related U.S. Appl. No. 18/019,060, dated Sep. 5, 2024, 7 pages.
Official action issued in related U.S. Appl. No. 18/267,072, dated Sep. 6, 2024, 9 pages.
Official Action issued in related U.S. Appl. No. 18/027,599, dated Sep. 20, 2024, 15 pages.
Official Action issued in related U.S. Appl. No. 18/019,057, dated Sep. 27, 2024, 11 pages.
Official action issued in related U.S. Appl. No. 18/267,072, dated Oct. 9, 2024, 15 pages.
Office action issued in related U.S. Appl. No. 18/019,230, dated Oct. 15, 2024, 13 pages.
Notice of Allowance issued in U.S. Appl. No. 18/017,825, dated Aug. 8, 2024, 6 pages.
Notice of Allowance issued in U.S. Appl. No. 18/017,824, dated Aug. 27, 2024, 8 pages.
U.S. Appl. No. 18/019,057, filed Jan. 31, 2023, Fukudome et al.
U.S. Appl. No. 18/019,230, filed Feb. 1, 2023, Fukudome et al.
U.S. Appl. No. 18/019,060, filed Jan. 31, 2023, Kanzaki et al.
U.S. Appl. No. 18/017,825, filed Jan. 24, 2023, Hayama et al.
U.S. Appl. No. 18/017,824, filed Jan. 24, 2023, Ejima et al.
U.S. Appl. No. 18/029,063, filed Mar. 28, 2023, Higashidozono et al.
U.S. Appl. No. 18/029,065, filed Mar. 28, 2023, Higashidozono.
Official Action issued in Japanese related Application Serial No. 2022-541461, dated Nov. 26, 2024, 8 pages with English Translation.
Official Action issued in Japanese related Application Serial No. 2022-541462, dated Nov. 28, 2024, 8 pages with English Translation.
Official Action issued in Japanese related Application Serial No. 2022-541463, dated Dec. 3, 2024, 8 pages with English Translation.
Official Action issued in Japanese related Application Serial No. 2022-541464, dated Nov. 22, 2024, 9 pages with English Translation.
Official Action issued in Japanese related Application Serial No. 2022-541458, dated Dec. 24, 2024, 8 pages with English Translation.
Official action issued in related U.S. Appl. No. 18/267,072, dated Dec. 19, 2024, 13 pages.
Official action issued in related U.S. Appl. No. 18/029,065, dated Nov. 15, 2024, 14 pages.

\* cited by examiner

X – X CROSS-SECTIONAL VIEW

FLUID CONTROL VALVE

TECHNICAL FIELD

The present invention relates to a fluid control valve for that variably controlling a working fluid, for example, a fluid control valve that controls a discharge amount of a variable displacement compressor used for an air conditioning system of an automobile according to pressure.

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of fluid. This tilt angle of the swash plate can be continuously changed by appropriately controlling pressure in a control chamber while utilizing a suction pressure Ps of a suction chamber that suctions the fluid, a discharge pressure Pd of a discharge chamber that discharges the fluid pressurized by the pistons, and a control pressure Pc of the control chamber that houses the swash plate, by means of a capacity control valve to be driven to open and close by electromagnetic force.

At the time of continuously driving the variable displacement compressor, the capacity control valve performs normal control in which energization is controlled by a control computer, a valve body is moved in an axial direction by electromagnetic force generated in a solenoid, and a valve provided between a discharge port through which a discharge fluid of the discharge pressure Pd passes and a control port through which a control fluid of the control pressure Pc passes is opened and closed to adjust the control pressure Pc of the control chamber of the variable displacement compressor.

During normal control of the capacity control valve, the pressure of the control chamber in the variable displacement compressor is appropriately controlled, and the tilt angle of the swash plate with respect to the rotating shaft is continuously changed to change the stroke amount of the pistons and to control the amount of discharge of the fluid to the discharge chamber, so that the air conditioning system is adjusted to have a target cooling capacity.

In addition, there is a capacity control valve that opens and closes a poppet valve provided between the control port and a suction port, to control a flow rate of the fluid flowing from the control port to the suction port (refer to Patent Citation 1). Such a capacity control valve controls the control pressure Pc of the control chamber of the variable displacement compressor using a pressure difference between the control pressure Pc and the suction pressure Ps lower than the control pressure Pc. Incidentally, the control chamber of the variable displacement compressor communicates with the discharge chamber of the variable displacement compressor via an orifice, and the discharge pressure Pd of high pressure is constantly supplied to the control chamber through the orifice to adjust the control pressure Pc.

CITATION LIST

Patent Literature

Patent Citation 1: JP 2015-075054 A (PAGES 8 to 10 and FIG. 2)

SUMMARY OF INVENTION

Technical Problem

Since the capacity control valve of Patent Citation 1 uses the pressure difference between the control pressure Pc lower than the discharge pressure Pd and the suction pressure Ps when the flow rate of the fluid is to be controlled by the opening and closing of the poppet valve, the flow rate of the fluid passing through the poppet valve can be reduced, but due to the influence of the discharge pressure Pd that is constantly supplied through the orifice to adjust the control pressure Pc, even when an electric current set in advance is input to the solenoid, a variation occurs in the stroke of the valve body, and an opening degree of the valve is offset from a target value. From the research by the inventors, it has been found that the stroke of the valve body is affected by causing a refrigerant to pass through the poppet valve at a flow speed close to the speed of sound, and the above variation can be suppressed by using this manner.

The present invention is conceived in view of such a problem, and an object of the present invention is to provide a valve having high controllability.

Solution to Problem

In order to solve the foregoing problem, a valve according to the present invention includes: a valve housing provided with an inlet port and an outlet port; a valve body to be driven by a drive source; a spring that urges the valve body in a direction opposite a direction of driving by the drive source; and a valve seat formed at an edge of a through-flow passage the valve body and the valve seat cooperatively forming a poppet valve, the valve being configured to control a flow rate in accordance with a movement of the valve body, wherein a flow passage on a downstream side of the poppet valve is provided with an increase region where a flow passage cross-sectional area tends to increase toward the downstream side. According to the aforesaid feature of the present invention, when a fluid passing through the poppet valve flows at a supersonic speed, the fluid passing through the increase region in the flow passage on the downstream side of the poppet valve increases in flow speed, and the downstream pressure of the poppet valve decreases. Accordingly, a force in a valve opening direction acts on the valve body, so that the influence of the pressure of the fluid on an upstream side on a force due to a back pressure acting on the valve body can be suppressed, and a variation in the stroke of the valve body with respect to an electric current value input to a solenoid is suppressed. In addition, when the fluid passing through the poppet valve flows at a subsonic speed, the fluid passing through the increase region in the flow passage on the downstream side of the poppet valve decreases in flow speed, and the downstream pressure of the poppet valve increases. Accordingly, a force in a valve closing direction acts on the valve body, so that the valve closing characteristic can be improved, and the poppet valve can be closed with a small electric current value. Accordingly, the opening degree of the poppet valve can be accurately adjusted.

It may be preferable that the flow passage cross-sectional area of the increase region continuously increases. According to this preferable configuration, the flow of the fluid passing through the increase region in the flow passage on the downstream side of the poppet valve can be stabilized to eliminate stagnation.

It may be preferable that the valve seat has a tilted shape in a cross-sectional view and the valve body has a curved shape in a cross-sectional view. According to this preferable configuration, since the increase region is formed between the valve seat and the valve body that form the poppet valve, the flow of the fluid passing through the poppet valve at a valve closing position or a throttle position of the valve body can be stabilized in a tangential direction.

It may be preferable that the tilted shape is a linear shape. According to this preferable configuration, the flow of the fluid passing through the poppet valve at the valve closing position or the throttle position of the valve body can be guided along a tilted surface while the flow is directed in the tangential direction, so that the flow of the fluid can be stabilized to the downstream side of the poppet valve.

It may be preferable that a tilted surface forming the valve seat is continuous with an opening of the outlet port. According to this preferable configuration, since the flow of the fluid passing through the poppet valve is guided to the opening of the outlet port along the tilted surface forming the valve seat, the downstream pressure of the poppet valve can be stabilized.

It may be preferable that the valve seat is formed in a valve seat member that is separate from the valve housing. According to this preferable configuration, the tilted surface forming the valve seat can be extended to the vicinity of the outlet port.

DESCRIPTION OF EMBODIMENTS

Modes for carrying out a valve according to the present invention will be described below based on embodiments. Incidentally, in the embodiments, a capacity control valve will be described as an example but the present invention is applicable to other uses.

First Embodiment

Figure 1:
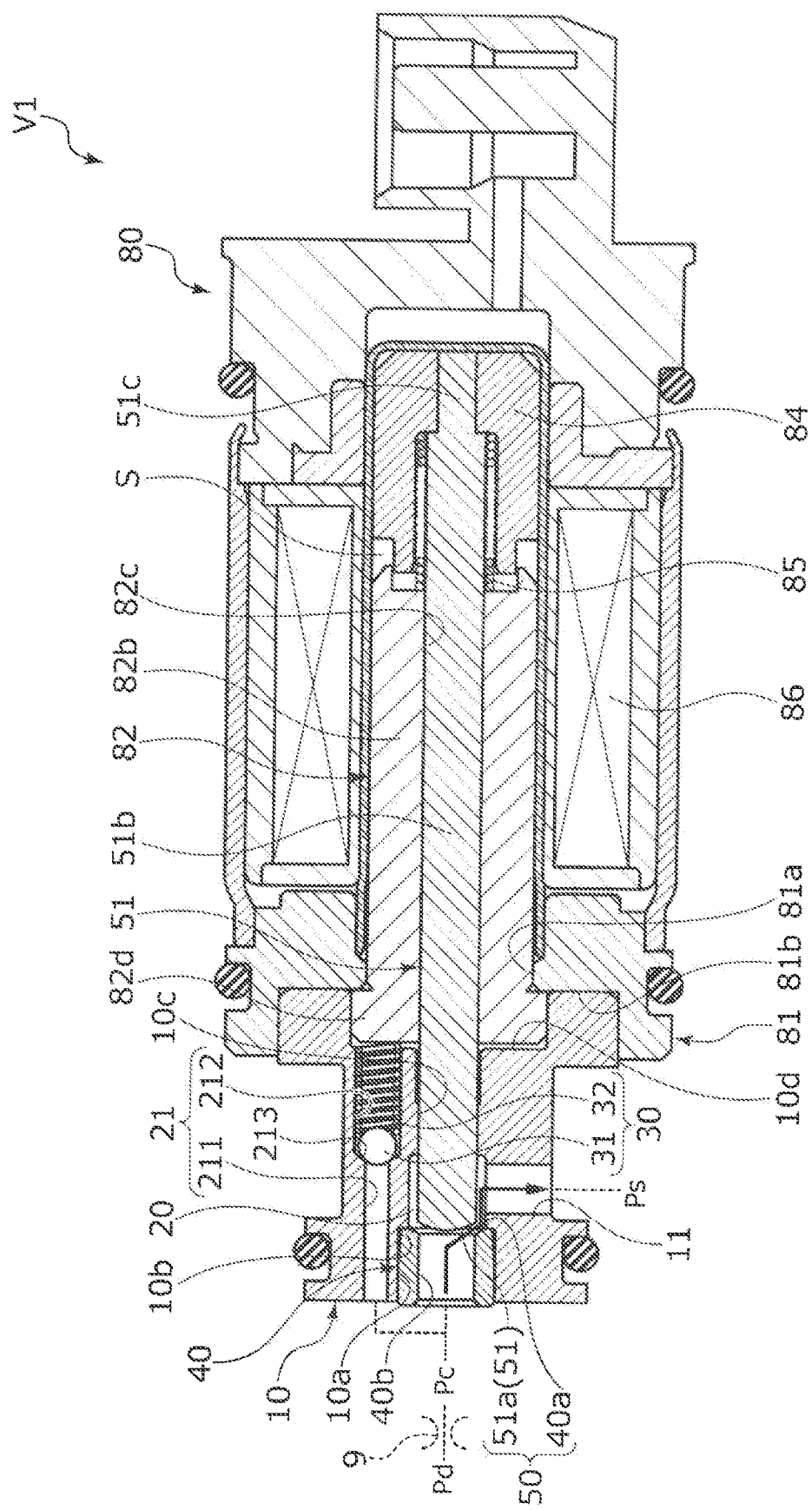
FIG. 1 is a cross-sectional view showing a state where a CS valve is opened in a non-energized state of a capacity control valve as a valve according to a first embodiment of the present invention.

A capacity control valve as a valve according to a first embodiment of the present invention will be described with reference to FIGS. 1 to 3. Hereinafter, a description will be given based on the assumption that the left and right sides when seen from the front side of FIG. 1 are left and right sides of the capacity control valve. In detail, a description will be given based on the assumption that the left side of the drawing sheet on which a valve housing 10 is disposed is the left side of the capacity control valve and the right side of the drawing sheet on which a solenoid 80 is disposed is the right side of the capacity control valve.

The capacity control valve of the present invention is assembled into a variable displacement compressor (not shown) used for an air conditioning system of an automobile, etc., and by variably controlling the pressure of a working fluid (hereinafter, simply referred to as a "fluid") that is a refrigerant, controls the discharge amount of the variable displacement compressor to adjust the air conditioning system to have a desired cooling capacity.

First, the variable displacement compressor will be described. The variable displacement compressor includes a casing including a discharge chamber, a suction chamber, a control chamber, and a plurality of cylinders. Incidentally, the variable displacement compressor is provided with a communication passage that provides direct communication between the discharge chamber and the control chamber. The communication passage is provided with a fixed orifice 9 that balances the pressures of the discharge chamber and the control chamber (refer to FIG. 1).

In addition, the variable displacement compressor includes a rotating shaft, a swash plate, and a plurality of pistons. The rotating shaft is rotationally driven by an engine (not shown) installed outside the casing. The swash plate is coupled to the rotating shaft so as to be tiltable by a hinge mechanism in the control chamber. The plurality of pistons are coupled to the swash plate and are reciprocatably fitted in the respective cylinders. The variable displacement compressor continuously changes the tilt angle of the swash plate by appropriately controlling pressure in the control chamber while utilizing a suction pressure Ps of the suction chamber that suctions the fluid, a discharge pressure Pd of the discharge chamber that discharges the fluid pressurized by the pistons, and a control pressure Pc of the control chamber that houses the swash plate, by means of the capacity control valve V1 to be driven to open and close by electromagnetic force, and thus changes the stroke amount of the pistons to control the discharge amount of the fluid.

As shown in FIG. 1, the capacity control valve V1 of the first embodiment assembled into the variable displacement compressor adjusts an electric current that energizes a coil 86 forming the solenoid 80 as a drive source, to perform opening and closing control of a CS valve 50 as a poppet valve in the capacity control valve V1. Accordingly, the fluid flowing out from the control chamber to the suction chamber is controlled to variably control the control pressure Pc in the control chamber. Incidentally, a discharge fluid of the discharge pressure Pd of the discharge chamber is constantly supplied to the control chamber via the fixed orifice 9, and the CS valve 50 in the capacity control valve V1 is closed, so that the control pressure Pc in the control chamber is increased.

In the capacity control valve V1 of the first embodiment, the CS valve 50 includes a CS valve body 51 as a valve body and a CS valve seat 40a as a valve seat. The CS valve seat 40a is formed in a valve seat member 40 having a tubular shape that is press-fitted and fixed to a recessed portion 10a of the valve housing 10. A contact portion 51a formed at an axially left end of the CS valve body 51 comes into contact with and separates from the CS valve seat 40a in an axial direction to open and close the CS valve 50.

Next, a structure of the capacity control valve V1 will be described. As shown in FIG. 1, the capacity control valve V1 mainly includes the valve housing 10, the valve seat member 40, the CS valve body 51, and the solenoid 80. The valve housing 10 and the valve seat member 40 are made of a metallic material. The CS valve body 51 is disposed inside the valve housing 10 so as to be reciprocatable in the axial direction. The solenoid 80 is connected to the valve housing 10 to exert a driving force on the CS valve body 51.

As shown in FIG. 1, the CS valve body 51 includes a large-diameter portion 51b and a small-diameter portion 51c. The large-diameter portion 51b is made of a metallic material or a resin material and is a columnar body having a constant cross section. The small-diameter portion 51c extends from a radially inner side of an axially right end of the large-diameter portion 51b to the right in the axial direction. In addition, the CS valve body 51 also serves as a rod that is disposed through the coil 86 of the solenoid 80.

The contact portion 51a having a curved shape in a cross-sectional view that bulges out toward the CS valve seat 40a is formed on an axially left end surface of the CS valve body 51, namely, on an axially left end surface of the large-diameter portion 51b. In detail, the curved shape of the contact portion 51a is formed by a part of a spherical surface having a constant radius of curvature. Incidentally, the curved shape of the contact portion 51a may not be formed by a part of a spherical surface having a constant radius of curvature as long as the contact portion 51a can be seated on the CS valve seat 40a.

As shown in FIG. 1, the solenoid 80 mainly includes a casing 81, a center post 82, the CS valve body 51, a movable iron core 84, a coil spring 85, and the coil 86 for excitation. The casing 81 includes an opening portion 81a that is open to the left in the axial direction. The center post 82 is inserted into the opening portion 81a of the casing 81 from the left in the axial direction to be disposed between a radially inner side of the casing 81 and a radially inner side of the valve housing 10, and has a substantially cylindrical shape. The CS valve body 51 is inserted into the center post 82 to be reciprocatable in the axial direction, and an axially left end portion of the CS valve body 51 is disposed inside the valve housing 10. An axially right end portion of the CS valve body 51 is inserted and fixed to the movable iron core 84. The coil spring 85 is provided between the center post 82 and the movable iron core 84 to urge the movable iron core 84 to the right in the axial direction, which is a valve opening direction of the CS valve 50. The coil 86 is wound on an outer side of the center post 82 with a bobbin interposed therebetween.

The center post 82 includes a cylindrical portion 82b and a flange portion 82d having an annular shape. The cylindrical portion 82b is made of a rigid body that is a magnetic material such as iron or silicon steel, and an insertion hole 82c which extends in the axial direction and into which the CS valve body 51 is inserted is formed in the cylindrical portion 82b. The flange portion 82d extends from an outer peripheral surface of an axially left end portion of the cylindrical portion 82b in a radially outward direction.

As shown in FIG. 1, a Ps port 11 as an outlet port is formed in the valve housing 10. The Ps port 11 penetrates through the valve housing 10 in a radial direction and communicates with the suction chamber of the variable displacement compressor. In addition, the recessed portion 10a into which the valve seat member 40 having a tubular shape is press-fitted from the left in the axial direction is formed on an axially left side of the valve housing 10. Incidentally, a Pc port as an inlet port is formed in the valve housing 10. The valve seat member 40 is press-fitted and fixed to the recessed portion 10a, so that the Pc port communicates with the control chamber of the variable displacement compressor through a through-hole 40b penetrating through the valve seat member 40 in the axial direction.

A valve chamber 20 is formed inside the valve housing 10, and the contact portion 51a of the CS valve body 51 is disposed in the valve chamber 20 so as to be reciprocatable in the axial direction. In addition, the Ps port 11 extends from an outer peripheral surface of the valve housing 10 in a radially inward direction to communicate with the valve chamber 20.

As described above, inside the valve housing 10, the through-hole 40b of the valve seat member 40, the valve chamber 20, and the Ps port 11 form a flow passage that provides communication between the control chamber and the suction chamber of the variable displacement compressor.

In addition, a guide hole 10c is formed in an inner peripheral surface of the valve housing 10. The guide hole 10c is formed on an axially right side of the valve chamber 20, to which the solenoid 80 is attached, and an outer peripheral surface 51d of the large-diameter portion 51b of the CS valve body 51 (refer to FIG. 3) is slidable on the guide hole 10c. Incidentally, an inner peripheral surface of the guide hole 10c and the outer peripheral surface 51d of the large-diameter portion 51b of the CS valve body 51 are slightly separated from each other in the radial direction to form a very small gap therebetween, and the CS valve body 51 is smoothly movable relative to the valve housing 10 in the axial direction.

Figure 2:
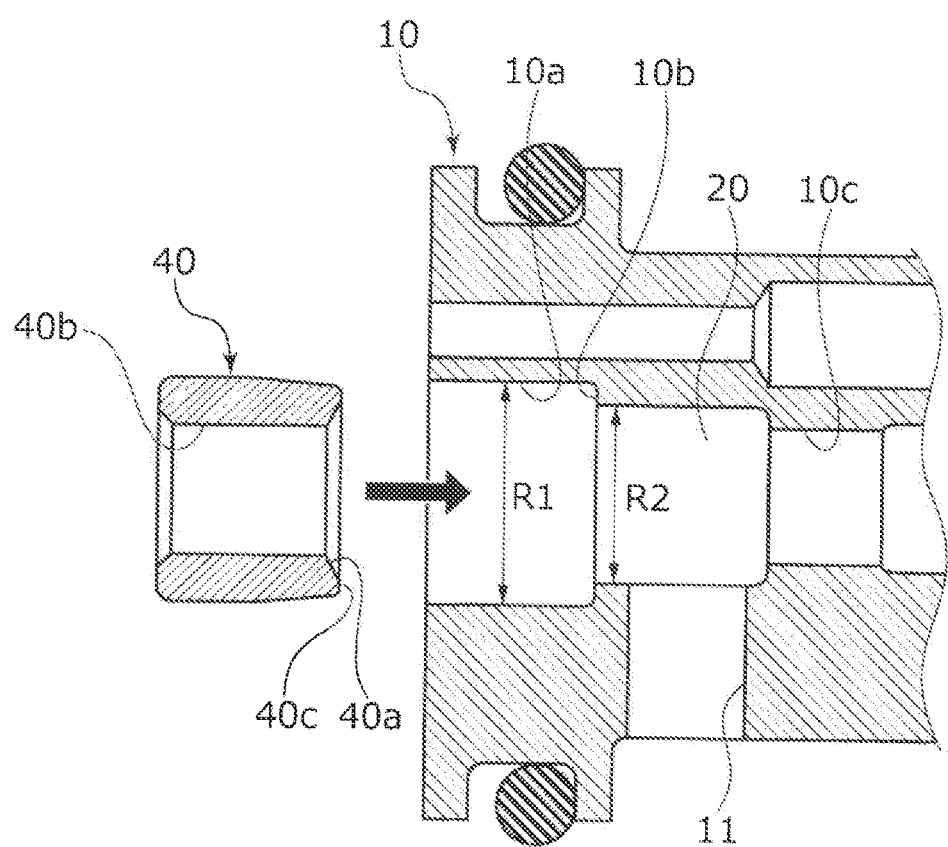
FIG. 2 is a cross-sectional view showing a state where a valve seat member is press-fitted into a valve housing of the capacity control valve in the first embodiment.

As shown in FIG. 2, an inner diameter R1 of the recessed portion 10a of the valve housing 10 is set to be larger than an inner diameter R2 of the valve chamber 20 (R1>R2), so that a bottom surface of the recessed portion 10a forms a receiving portion 10b that can come into contact with a flat surface 40c on an axially right side of the valve seat member 40.

As shown in FIG. 1, a recessed portion 10d recessed to the left in the axial direction is formed on an axially right side of the valve housing 10. The flange portion 82d of the center post 82 is inserted and fixed to the recessed portion 10d from the right in the axial direction in a substantially sealed state, and the casing 81 is inserted and fixed to the valve housing 10 from the right in the axial direction in a substantially sealed state, so that the valve housing 10, the center post 82, and the casing 81 are integrally connected to each other.

As described above, in a state where the valve housing 10, the center post 82, and the casing 81 are integrally connected to each other, an axially right end surface of the valve housing 10 and a side surface on an axially right side of the flange portion 82d of the center post 82 are in contact with a bottom surface of a recessed portion 81b formed on an axially left side of the casing 81, and a bottom surface of the recessed portion 10d of the valve housing 10 and an axially left end surface of the center post 82 are separated from each other in the axial direction to form a gap therebetween.

In addition, a through-hole 21 is formed in the valve housing 10. The through-hole 21 is formed to extend in the axial direction between an axially left end surface of the valve housing 10 and a bottom portion of the recessed portion 10d. The through-hole 21 includes a small-diameter hole portion 211 of which an axially left end communicates with the control chamber of the variable displacement compressor, and a large-diameter hole portion 212 extending continuously from an axially right end of the small-diameter hole portion 211 and having a larger diameter than that of the small-diameter hole portion 211. An axially right end of the large-diameter hole portion 212 is open to the gap formed between the bottom surface of the recessed portion 10d and the axially left end surface of the center post 82. Incidentally, the control fluid of the control pressure Pc is supplied from the control chamber of the variable displacement compressor into the small-diameter hole portion 211 of the through-hole 21 and into the through-hole 40b of the valve seat member 40.

An actuating valve body 31 having a ball shape and a return spring 32 of which an axially right end is fixed to the axially left end surface of the center post 82 and of which an axially left end is in contact with the actuating valve body 31 from the right in the axial direction are disposed in the large-diameter hole portion 212 of the through-hole 21. In addition, the actuating valve body 31 is urged to the left in the axial direction by the return spring 32. The actuating valve body 31 and the return spring 32 form a pressure-actuated valve 30 that controls communication between the control chamber of the variable displacement compressor and an internal space S of the casing 81 in the through-hole 21.

Although not shown for convenience of description, when the control pressure Pc is high, the actuating valve body 31 of the pressure-actuated valve 30 moves to the right in the axial direction against an urging force of the return spring 32 and against the pressure of the fluid in the internal space S of the casing 81, to be separated from a valve seat 213 having a tilted shape in a cross-sectional view that is formed at a connecting portion between the axially right end of the small-diameter hole portion 211 and an axially left end of the large-diameter hole portion 212 in the through-hole 21, so that the pressure-actuated valve 30 is opened. Accordingly, the control chamber of the variable displacement compressor and the internal space S of the casing 81 communicate with each other via the through-hole 21, the control fluid of the control pressure Pc is supplied from the control chamber of the variable displacement compressor to the internal space S of the casing 81 through the through-hole 21, and a difference between the pressure of the fluid in the internal space S of the casing 81 and the pressure of the control fluid in the through-hole 40b of the valve seat member 40 is reduced, so that the CS valve body 51 can be smoothly operated to the left in the axial direction, namely, in a valve closing direction, and responsiveness to control at a high output of the variable displacement compressor can be improved.

Incidentally, in the valve housing 10, the very small gap between the inner peripheral surface of the guide hole 10c and the outer peripheral surface of the large-diameter portion 51b of the CS valve body 51 functions as a throttle. Accordingly, the fluid in the internal space S of the casing 81 can be gently released to the Ps port 11. During non-use for a long time, a state where a pressure difference between the pressure of the fluid in the valve chamber 20 and the pressure of the fluid in the internal space S of the casing 81 is small is maintained.

Here, the valve seat member 40 will be described. As shown in FIG. 2, the valve seat member 40 is made of a metallic material harder than a metallic material used for the valve housing 10. Further, the valve seat member 40 may be made of a material that is different from that of the CS valve body 51.

In addition, the valve seat member 40 has a tubular shape in which the through-hole 40b penetrating therethrough in the axial direction is formed. The CS valve seat 40a having a tilted shape in a cross-sectional view is formed at an axially right end portion of the valve seat member 40. The flat surface 40c having an annular shape and the CS valve seat 40a that is continuous from a radially inner side of the flat surface 40c and that is gradually reduced in diameter toward the left in the axial direction are formed from a radially outer side to a radially inner side. Namely, the CS valve seat 40a is formed at an edge of the through-hole 40b as a through-flow passage and is formed of a tapered surface that is a tilted surface having a linear cross section and extending in a circumferential direction.

In addition, the flat surface 40c on the axially right side of the valve seat member 40 is brought into contact with the receiving portion 10b formed by the bottom surface of the recessed portion 10a, in the axial direction (refer to FIG. 3), so that the progress of insertion of the valve seat member 40 into the recessed portion 10a can be defined, and the sealing property between the valve housing 10 and the valve seat member 40 can be improved. At this time, a radially outer end of the tapered surface forming the CS valve seat 40a is disposed to be continuous with an axially left end of an inner peripheral surface 10e in the valve chamber 20 of the valve housing 10.

Figure 3:
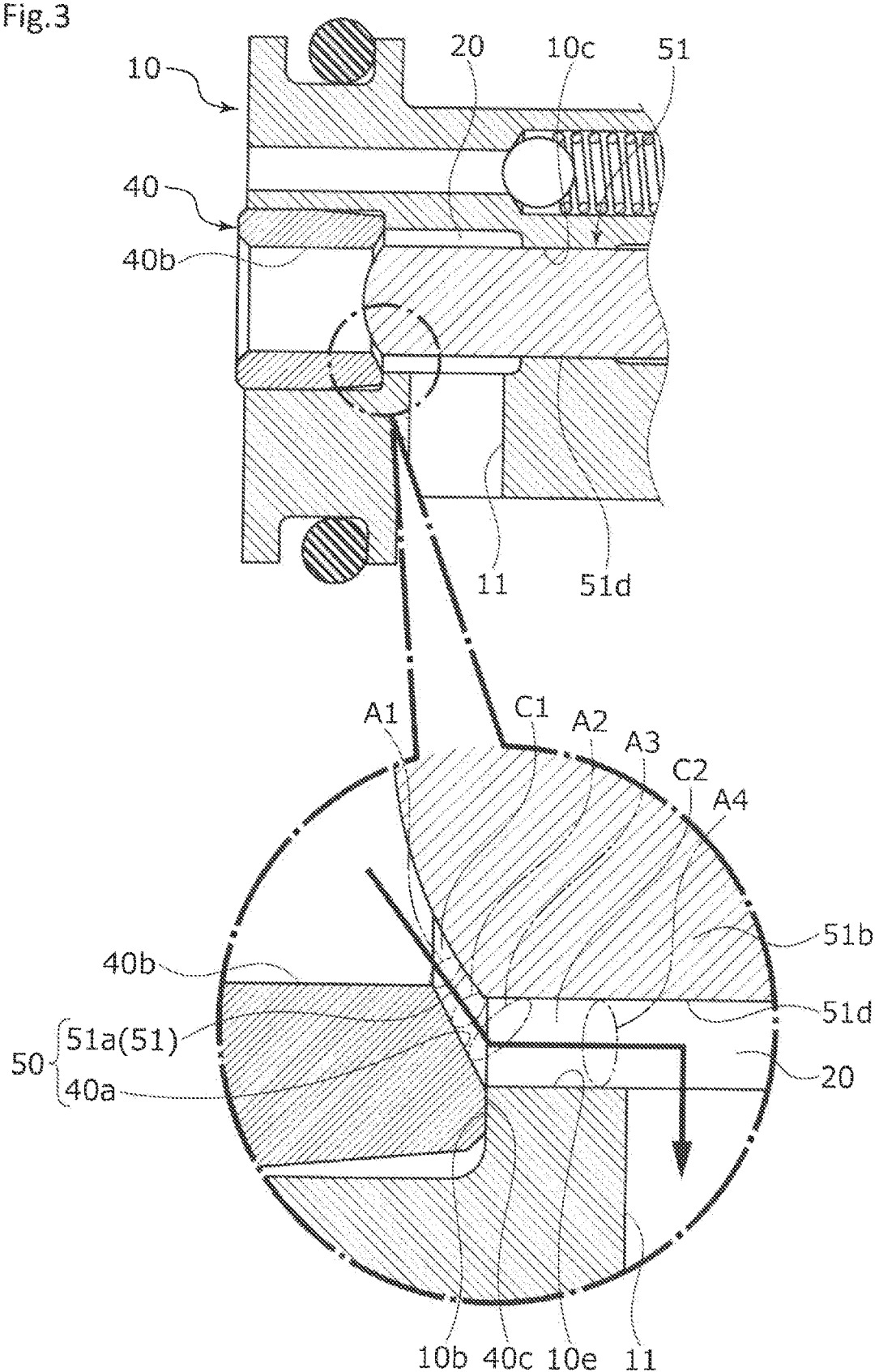
FIG. 3 is an enlarged cross-sectional view showing an increase region in a flow passage on a downstream side of the CS valve in an energized state (during normal control) of the capacity control valve in the first embodiment.

Accordingly, a flow passage C1 formed between the tapered surface forming the CS valve seat 40a of the valve seat member 40 and the contact portion 51a of the CS valve body 51, and a flow passage C2 formed between the tapered surface forming the CS valve seat 40a and the outer peripheral surface 51d of the large-diameter portion 51b of the CS valve body 51 and between the inner peripheral surface 10e of the valve housing 10 and the outer peripheral surface 51d of the large-diameter portion 51b of the CS valve body 51 form a flow passage on a downstream side of the CS valve 50, the flow passage extending to an opening on a valve chamber 20 side of the Ps port 11 (refer to FIG. 3). Incidentally, FIG. 3 shows a state where the CS valve body 51 is stroked to a throttle position in the vicinity of a closing position during normal control of the capacity control valve V1.

In the first embodiment, the flow passage C1 forms an increase region where a flow passage cross-sectional area A2 between the tapered surface forming the CS valve seat 40a and a radially outer end of the contact portion 51a of the CS valve body 51 is larger than a flow passage cross-sectional area A1 between a radially inner end of the tapered surface forming the CS valve seat 40a and the contact portion 51a of the CS valve body 51 (A1<A2) and the flow passage cross-sectional area tends to increase toward a downstream side (dA>0). In addition, the flow passage C2 forms an increase region where a flow passage cross-sectional area A4 between the inner peripheral surface 10e of the valve housing 10 and the outer peripheral surface 51d of the CS valve body 51 is larger than a flow passage cross-sectional area A3 between the tapered surface forming the CS valve seat 40a and the outer peripheral surface 51d of the large-diameter portion 51b of the CS valve body 51 (A3<A4) and the flow passage cross-sectional area tends to increase toward the downstream side (dA>0). Incidentally, during normal control of the capacity control valve V1, in the state of FIG. 3 where the CS valve body 51 is stroked to the throttle position, the flow passage cross-sectional area A3 on an upstream side of the flow passage C2 is larger than the flow passage cross-sectional area A2 on a downstream side of the flow passage C1 (A2<A3).

Incidentally, the increase region is formed in a stroke range of the contact portion 51a of the CS valve body 51 in the flow passage on the downstream side of the CS valve 50.

In addition, the flow passage cross-sectional area of the flow passage C1 continuously increases toward the downstream side. On the other hand, in the flow passage C2, since the inner peripheral surface 10e of the valve housing 10 and the outer peripheral surface 51d of the CS valve body 51 are disposed in parallel to each other, the flow passage cross-sectional area A4 on a downstream side of the flow passage C2 is constant.

Next, a change in the flow speed and the pressure of the fluid passing through the flow passages C1 and C2 on the downstream side of the CS valve 50 will be described. Incidentally, the control pressure Pc will be described as being controlled within a range where the closing of the pressure-actuated valve 30 described above is maintained. A relational equation of cross-sectional area and pressure for the influence of an area change on an isentropic flow is shown below.

$$\frac{dp}{p} = -\frac{\gamma M^2}{M^2 - 1} \frac{dA}{A} \quad \text{[Equation 1]}$$

p: pressure
γ: specific heat ratio
M: Mach number
A: area

When a pressure difference between the control pressure Pc in the through-hole 40b of the valve seat member 40 and the suction pressure Ps in the Ps port 11, namely, a Pc–Ps differential pressure is large, and the fluid passing through the CS valve 50 flows at a supersonic speed (M>1), based on the relational equation of cross-sectional area and pressure, the fluid passing through the flow passage C1 that is a flow passage on the downstream side of the CS valve 50 and that forms an increase region where the flow passage cross-sectional area tends to increase toward the downstream side (dA>0) increases in flow speed and decreases in pressure. In addition, the fluid passing through the flow passage C2 that is continuous with the downstream side of the flow passage C1 and that forms an increase region where the flow passage cross-sectional area tends to increase toward the downstream side (dA>0) further increases in flow speed and decreases in pressure and then passes through the downstream side of the flow passage C2 in which the flow passage cross-sectional area is constant, so that the fluid stably flows substantially without a change in flow speed and pressure and flows into the Ps port 11 (refer to FIG. 3).

On the other hand, when the Pc–Ps differential pressure is small and the fluid passing through the CS valve 50 flows at a subsonic speed (M<1), the fluid passing through the flow passage C1 that is a flow passage on the downstream side of the CS valve 50 and that forms an increase region decreases in flow speed and increases in pressure. In addition, the fluid passing through the flow passage C2 that is continuous with the downstream side of the flow passage C1 and that forms an increase region where the flow passage cross-sectional area tends to increase toward the downstream side (dA>0) further decreases in flow speed and increases in pressure and then passes through the downstream side of the flow passage C2 in which the flow passage cross-sectional area is constant, so that the fluid stably flows substantially without a change in flow speed and pressure and flows into the Ps port 11 (refer to FIG. 3).

Incidentally, since the downstream pressure of the CS valve 50, namely, the pressure of the fluid in the valve chamber 20 is easily affected by the discharge pressure Pd that is constantly supplied via the fixed orifice 9 (refer to FIG. 1) to adjust the control pressure Pc in the control chamber of the variable displacement compressor, the pressure is less likely to decrease as compared to the pressure in the Ps port 11.

In the first embodiment, as described above, when the fluid flows at a supersonic speed and passes through the increase regions, the downstream pressure of the CS valve 50 can be reduced, so that the influence of the discharge pressure Pd on the pressure of the fluid in the internal space S of the casing 81 (refer to FIG. 1) that changes based on the pressure difference between the pressure of the fluid in the valve chamber 20 and the pressure of the fluid in the internal space S, namely, on a force due to a back pressure acting on the CS valve body 51 can be suppressed. In addition, when the fluid flows at a subsonic speed and passes through the increase regions, in addition to the influence of the discharge pressure Pd, the downstream pressure of the CS valve 50 can be increased, so that the pressure of the fluid in the internal space S of the casing 81 that changes based on the pressure difference between the pressure of the fluid in the valve chamber 20 and the pressure of the fluid in the internal space S, namely, a force due to a back pressure acting on the CS valve body 51 can be further increased.

Figure 4A:
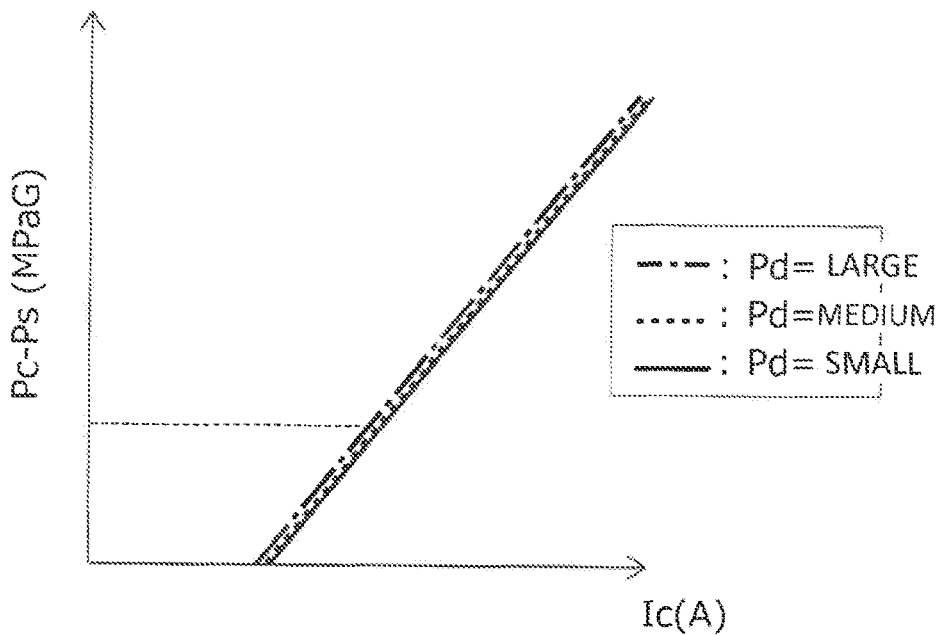
FIG. 4A is a graph schematically showing a valve closing characteristic in a supersonic flow of the capacity control valve in the first embodiment where a flow passage cross-sectional area tends to increase.
Figure 4B:
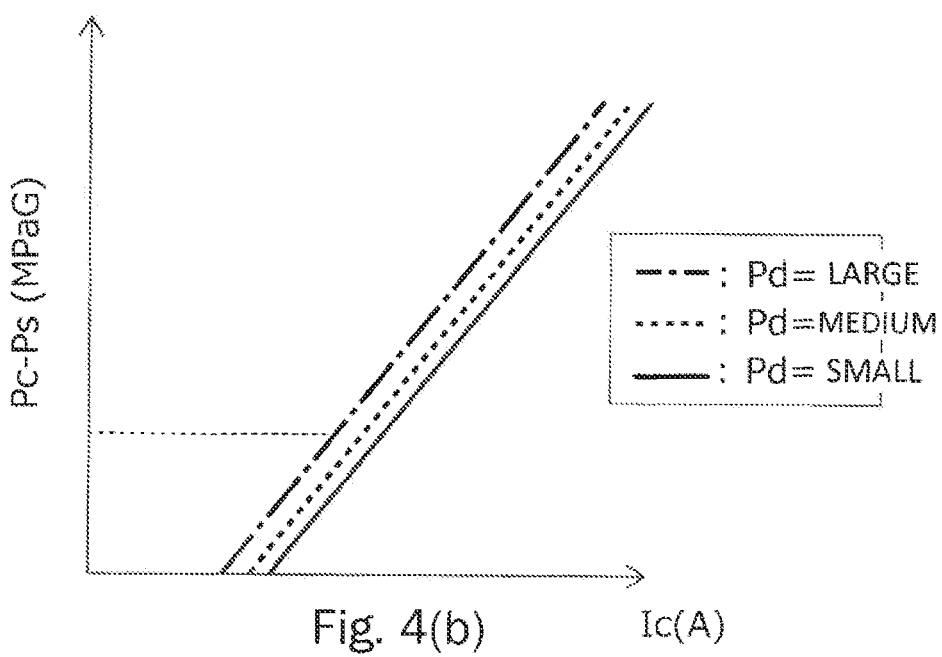
FIG. 4B is a graph schematically showing a valve closing characteristic of a comparative example where a flow passage cross-sectional area is constant.

As described above, in the capacity control valve V1 of the first embodiment, the flow passage on the downstream side of the CS valve 50 is provided with the flow passages C1 and C2 as increase regions where the flow passage cross-sectional area tends to increase toward the downstream side (dA>0). When the fluid passing through the CS valve 50 flows at a supersonic speed (M>1), the fluid passing through the flow passages C1 and C2 increases in flow speed and decreases in pressure, and a force in the valve opening direction acts on the CS valve body 51. Accordingly, as shown in FIG. 4A, the influence of the pressure of the fluid on an upstream side of the CS valve 50, in the present embodiment, the influence of the discharge pressure Pd on the downstream pressure of the CS valve 50 can be suppressed. Incidentally, in a reference graph of FIG. 4B showing a characteristic of a flow passage in which the flow passage cross-sectional area is constant (dA=constant), a variation in driving electric current is large. As described above, the influence of the discharge pressure Pd on a force due to a back pressure acting on the CS valve body 51 can be suppressed, a variation in the stroke of the CS valve body 51 with respect to an electric current value input to the solenoid 80 can be suppressed, and the opening degree of the CS valve 50 can be accurately adjusted.

Figure 5A:
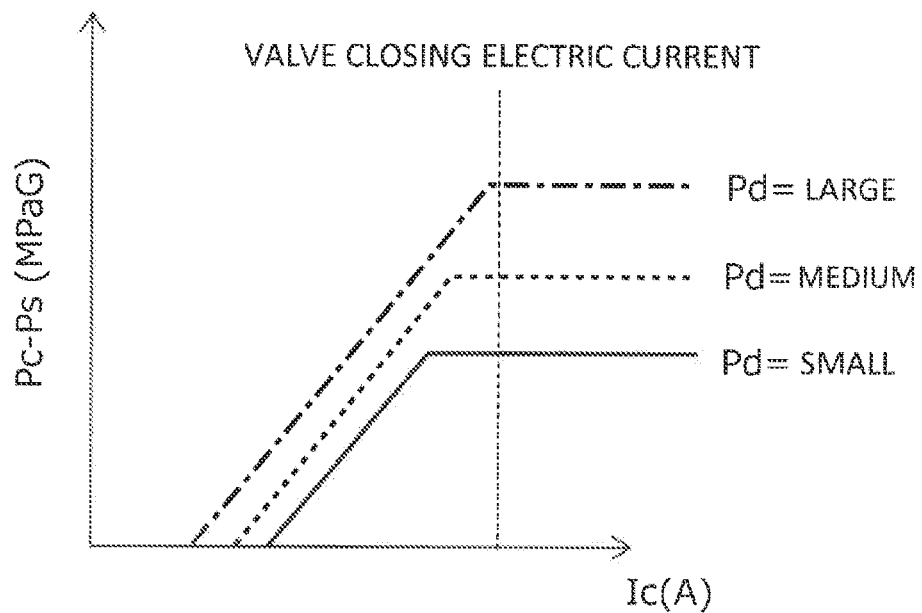
FIG. 5A is a graph schematically showing a valve closing characteristic in a subsonic flow of the capacity control valve in the first embodiment where the flow passage cross-sectional area tends to increase.
Figure 5B:
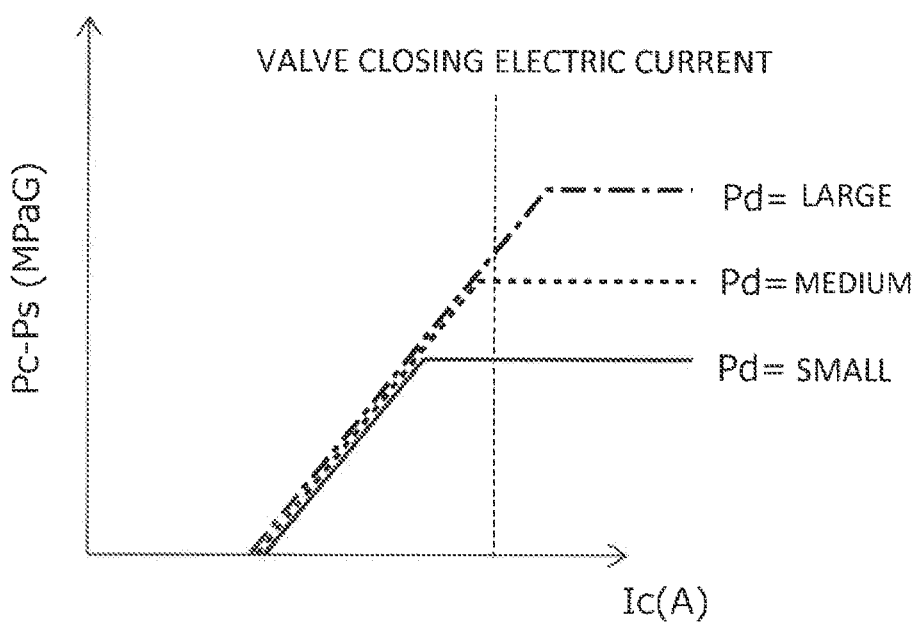
FIG. 5B is a graph schematically showing a valve closing characteristic of the comparative example where the flow passage cross-sectional area is constant.

In addition, when the fluid passing through the CS valve 50 flows at a subsonic speed (M<1), the fluid passing through the flow passages C1 and C2 decreases in flow speed and increases in pressure, and a force in the valve closing direction acts on the CS valve body 51. In addition, a force due to a back pressure acting on the CS valve body 51 which is affected by the discharge pressure Pd can be further increased. For this reason, as shown in FIG. 5A, the valve closing characteristic of the CS valve 50 can be improved, and the CS valve 50 can be closed with a small electric current value. Incidentally, in a reference graph of FIG. 5B showing a characteristic of a flow passage in which the flow passage cross-sectional area is constant (dA=constant), when the discharge pressure Pd is high, the valve cannot be closed, in other words, a large electric current is required to close the valve.

As described above, the flow passage on the downstream side of the CS valve 50 is provided with the flow passages C1 and C2 that are increase regions where the flow passage cross-sectional area tends to increase toward the downstream side (dA>0), and the downstream pressure of the CS valve 50 is appropriately controlled according to the flow speed of the fluid passing through the CS valve 50, so that the controllability of the CS valve 50 can be improved.

In addition, in the flow passage C1 as an increase region, the flow passage cross-sectional area continuously increases toward the downstream side, so that the flow of the fluid can be stabilized to eliminate stagnation. In addition, the flow speed or pressure of the fluid passing through the flow passage C1 can be changed in an accelerating manner.

In addition, since the CS valve 50 includes the CS valve seat 40a having a tilted shape in a cross-sectional view and the contact portion 51a having a curved shape in a cross-sectional view in the CS valve body 51, and the flow passage C1 as an increase region is formed between the tapered surface forming the CS valve seat 40a and the contact portion 51a of the CS valve body 51, the flow of the fluid passing through the CS valve 50 at the valve closing position or the throttle position of the CS valve body 51 can be stabilized in a tangential direction (refer to a solid arrow in FIG. 3).

In addition, since the CS valve seat 40a is formed of the tapered surface that is a tilted surface having a linear cross section and extending in the circumferential direction, the flow of the fluid passing through the CS valve 50 at the valve closing position or the throttle position of the CS valve body 51, in detail, the flow of the fluid on an upstream side of the flow passages C1 and C2 can be stabilized in the tangential direction, and the flow of the fluid can be guided along the tilted surface, the flow of the fluid can be stabilized to the downstream side of the CS valve 50.

In addition, the tapered surface forming the CS valve seat 40a may be located downstream along a normal line of the contact portion 51a of the CS valve body 51, and accordingly, the fluid that has passed through the increase regions travels linearly, so that the flow speed of the fluid close to the speed of sound is unlikely to be interfered with.

In addition, on the downstream side of the flow passage C2, the flow passage cross-sectional area is constant to the opening on the valve chamber 20 side of the Ps port 11, and the flow of the fluid can be stabilized substantially without a change in the flow speed and the pressure of the passing fluid, so that the pressure of the fluid in the valve chamber 20 is easily stabilized.

In addition, since the flow passage C1 can form an increase region by using the tapered surface forming the CS valve seat 40a of the CS valve 50 as a poppet valve and the contact portion 51a of the CS valve body 51, the structure of the capacity control valve V1 can be simplified.

In addition, since the CS valve seat 40a is formed in the valve seat member 40 that is separate from the valve housing 10, the accuracy of processing of the tapered surface for forming an increase region can be improved.

Incidentally, in the first embodiment, a mode has been described in which the flow passage cross-sectional area on the downstream side of the flow passage C2 that is continuous with the downstream side of the flow passage C1 is made constant by disposing the inner peripheral surface 10e of the valve housing 10 and the outer peripheral surface 51d of the CS valve body 51 in parallel to each other, but the present invention is not limited to the mode, and the shape of the inner peripheral surface 10e of the valve housing 10 or of the outer peripheral surface 51d of the CS valve body 51 may be changed such that an increase region where the flow passage cross-sectional area tends to increase toward the downstream side (dA>0) is also continuously formed on the downstream side of the flow passage C2.

Second Embodiment

A capacity control valve as a valve according to a second embodiment of the present invention will be described with reference to FIGS. 6 to 8. Incidentally, a description of duplicated configurations that are the same as the configurations of the first embodiment will be omitted.

Figure 6:
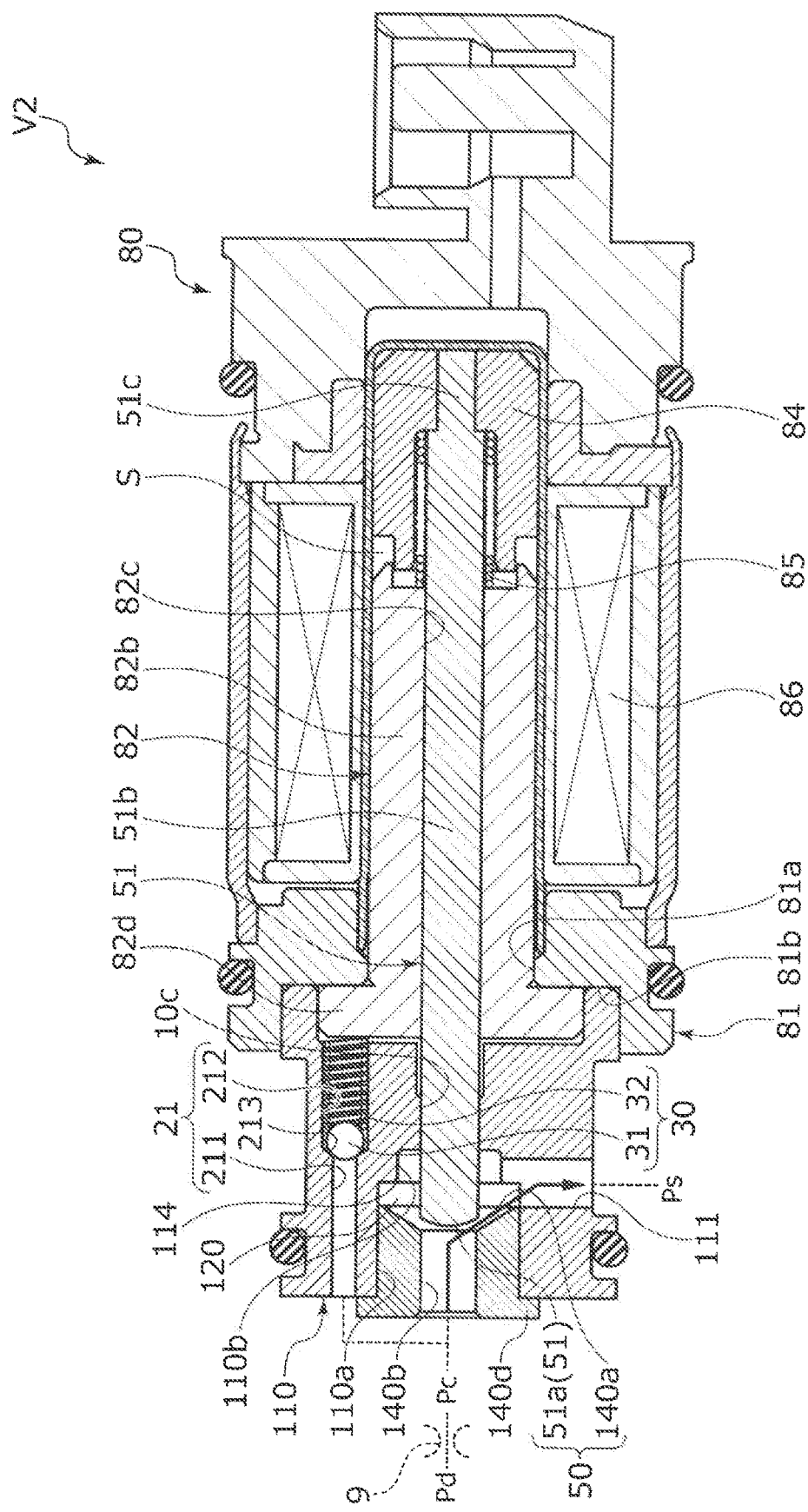
FIG. 6 is a cross-sectional view showing a state where a CS valve is opened in a non-energized state of a capacity control valve as a valve according to a second embodiment of the present invention.

As shown in FIG. 6, in a capacity control valve V2 according to the second embodiment of the present invention, a Ps port 111 is formed in a valve housing 110, as an outlet port that penetrates through the valve housing 110 in the radial direction and communicates with the suction chamber of the variable displacement compressor.

In addition, a first recessed portion 110a is formed on an axially left side of the valve housing 110. A valve seat member 140 having a flanged tubular shape is press-fitted into the first recessed portion 110a from the left in the axial direction. Incidentally, when the valve seat member 140 is press-fitted and fixed to the first recessed portion 110a, a Pc port as an inlet port communicating with the control chamber of the variable displacement compressor through a through-hole 140b penetrating through the valve seat member 140 in the axial direction is formed in the valve housing 110.

Inside the valve housing 110, the first recessed portion 110a and a second recessed portion 110b having a small diameter that is continuously formed on an axially right side of the first recessed portion 110a form a valve chamber 120. The contact portion 51a of the CS valve body 51 is disposed in the valve chamber 120 so as to be reciprocatable in the axial direction. In addition, the Ps port 111 extends from an outer peripheral surface of the valve housing 110 in the radially inward direction to communicate with the valve chamber 120.

Figure 7A:
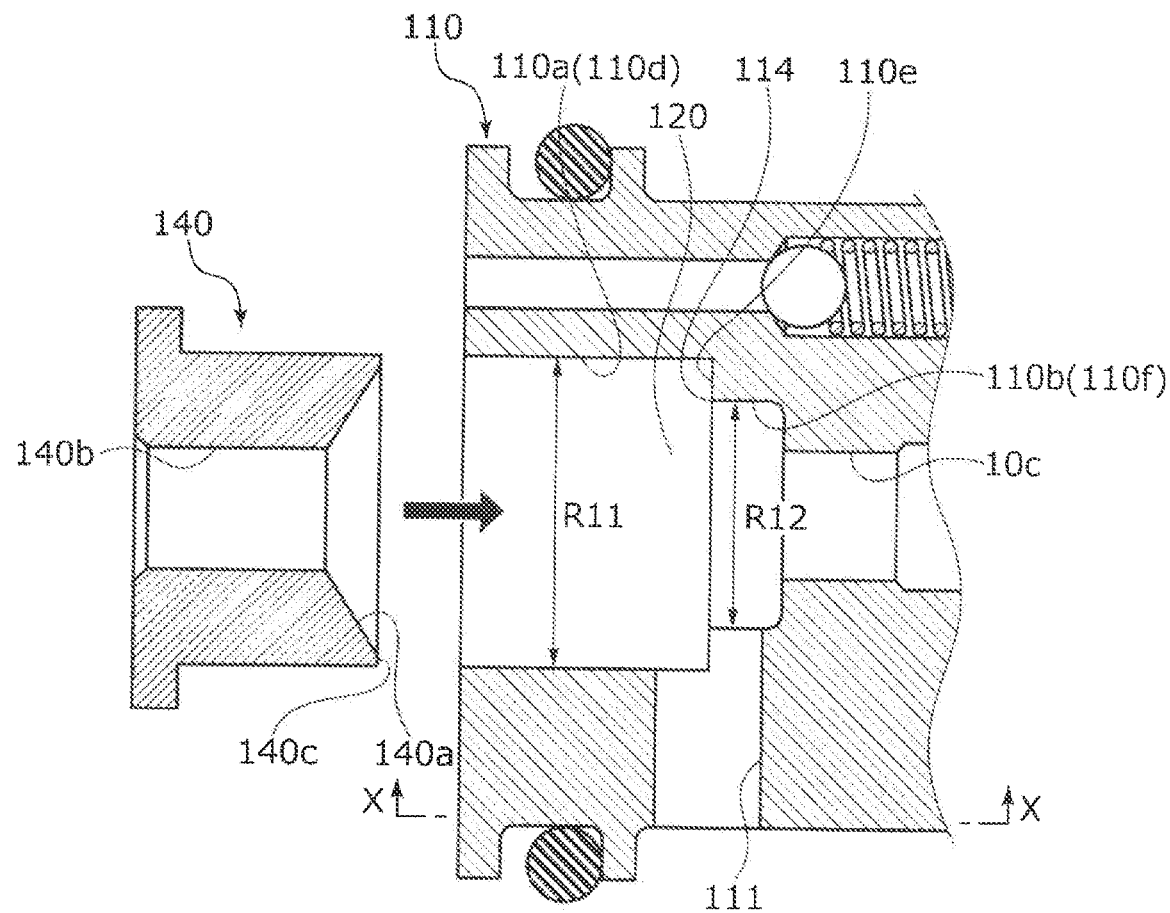
FIG. 7A is a cross-sectional view showing a state where a valve seat member is press-fitted into a valve housing of the capacity control valve in the second embodiment.
Figure 7B:
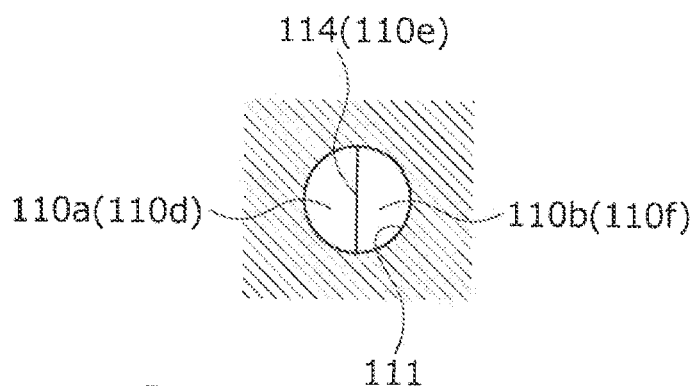
FIG. 7B is a view showing a Ps port when a cross section X-X of FIG. 7A is viewed from a radially outer side of the valve housing.

As shown in FIG. 7A, an inner diameter R11 of the first recessed portion 110a of the valve housing 110 is set to be larger than an inner diameter R12 of the second recessed portion 110b (R11>R12), so that a step portion 114 having an annular shape is formed in the valve chamber 120 by an inner peripheral surface 110d of the first recessed portion 110a, a bottom surface 110e extending from an axially right end of the inner peripheral surface 110d of the first recessed portion 110a in the radially inward direction, and an inner peripheral surface 110f of the second recessed portion 110b extending from a radially inner end of the bottom surface 110e of the first recessed portion 110a to the right in the axial direction. Incidentally, the step portion 114 having an annular shape is interrupted in the circumferential direction at the position of the Ps port 111.

In addition, an opening on a valve chamber 120 side of the Ps port 111 is disposed to lie between the inner peripheral surface 110d of the first recessed portion 110a and the inner peripheral surface 110f of the second recessed portion 110b in the axial direction, and has a step shape. In addition, the opening on the valve chamber 120 side communicates with the first recessed portion 110a and with the second recessed portion 110b and is also open to the left in the axial direction at the bottom surface 110e of the first recessed portion 110a to communicate with the first recessed portion 110a (refer to FIG. 7B).

As shown in FIG. 7A, the valve seat member 140 has a tubular shape in which the through-hole 140b penetrating therethrough in the axial direction is formed. A CS valve seat 140a as a valve seat is formed at an axially right end portion of the valve seat member 140. A flat surface 140c having an annular shape and the CS valve seat 140a having a tilted shape in a cross-sectional view that is continuous from a radially inner side of the flat surface 140c and that is gradually reduced in diameter toward the left in the axial direction are formed from a radially outer side to a radially inner side. Namely, the CS valve seat 140a is formed at an edge of the through-hole 140b as a through-flow passage and is formed of a tapered surface that is a tilted surface having a linear cross section and extending in the circumferential direction.

In addition, a flange portion 140d protruding an outer peripheral surface of the valve seat member 140 in the radially outward direction is formed at an axially left end portion of the valve seat member 140, and a side surface on an axially right side of the flange portion 140d is brought into contact with an axially left end surface of the valve housing 110 in the axial direction (refer to FIG. 8), so that the progress of insertion of the valve seat member 140 into the first recessed portion 110a can be defined. At this time, a radially outer end of the flat surface 140c is disposed to be continuous with an inner peripheral surface of the Ps port 111 in the radial direction, the Ps port 111 being open to the inner peripheral surface 110d of the first recessed portion 110a of the valve housing 110. In addition, a radially outer end of the tapered surface forming the CS valve seat 140a is located on a radially outer side of the second recessed portion 110b of the valve housing 110. Namely, the tapered surface forming the CS valve seat 140a extends to a position at which the tapered surface overlaps the opening on the valve chamber 120 side of the Ps port 111 in the axial direction.

Figure 8:
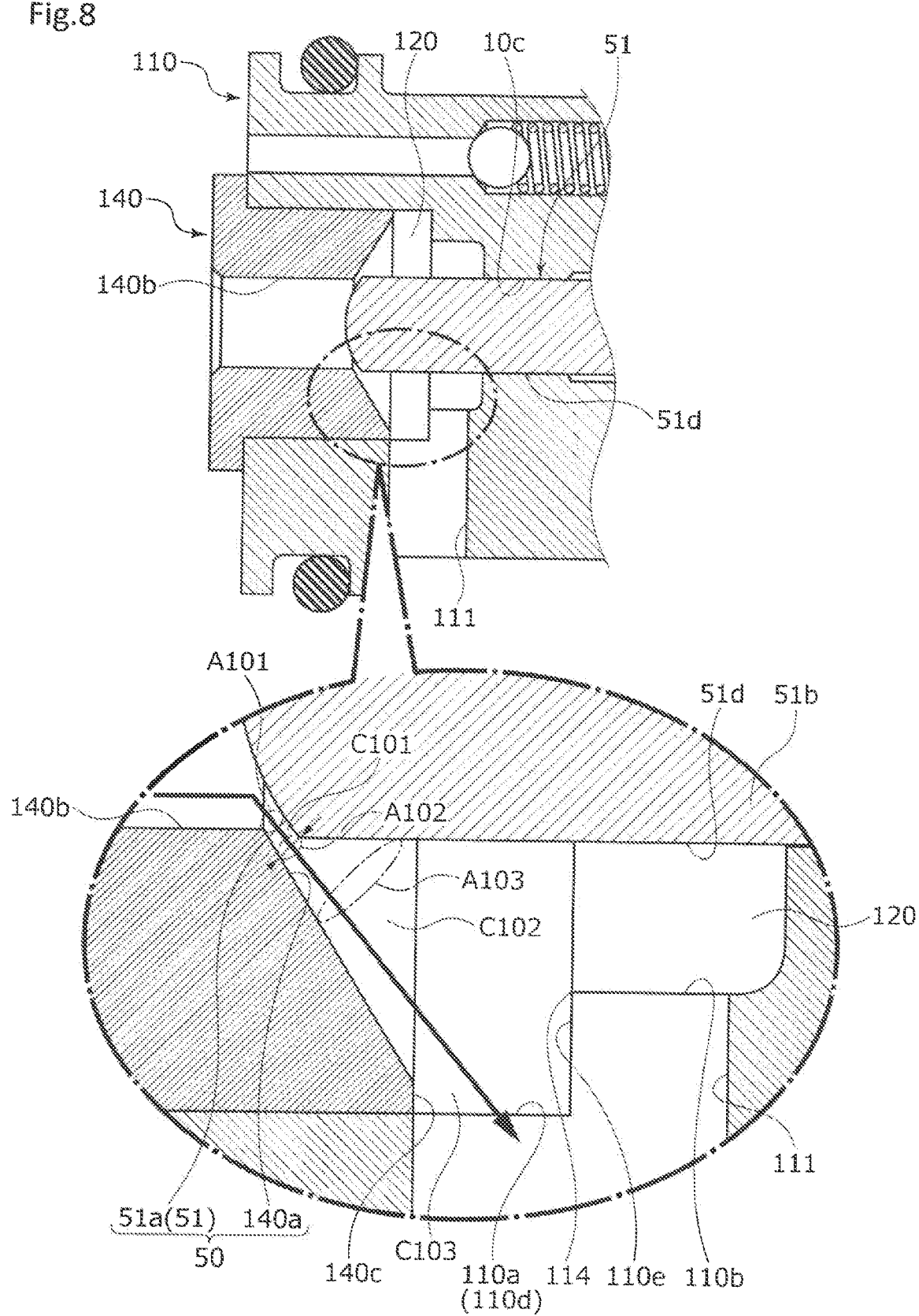
FIG. 8 is an enlarged cross-sectional view showing an increase region in a flow passage on a downstream side of the CS valve in an energized state (during normal control) of the capacity control valve in the second embodiment.

Accordingly, a flow passage C101 formed between the tapered surface forming the CS valve seat 140a of the valve seat member 140 and the contact portion 51a of the CS valve body 51, a flow passage C102 formed between the tapered surface forming the CS valve seat 140a of the valve seat member 140 and the outer peripheral surface 51d of the large-diameter portion 51b of the CS valve body 51, and a flow passage C103 formed between the flat surface 140c of the valve seat member 140 and the bottom surface 110e of the first recessed portion 110a forming the step portion 114 form a flow passage on the downstream side of the CS valve 50, the flow passage extending to the opening having a stepped shape on the valve chamber 120 side of the Ps port 111 (refer to FIG. 8). Incidentally, FIG. 8 shows a state where the CS valve body 51 is stroked to a throttle position in the vicinity of a closing position during normal control of the capacity control valve V2.

In the second embodiment, the flow passage C101 forms an increase region where a flow passage cross-sectional area A102 between the tapered surface forming the CS valve seat 140a and the radially outer end of the contact portion 51a of the CS valve body 51 is larger than a flow passage cross-sectional area A101 between a radially inner end of the tapered surface forming the CS valve seat 140a and the contact portion 51a of the CS valve body 51 (A101<A102) and the flow passage cross-sectional area tends to increase toward a downstream side (dA>0). In addition, the flow passage C102 forms an increase region where a radially outer portion of the tapered surface forming the CS valve seat 140a extends linearly to the position at which the radially outer portion overlaps the opening on the valve chamber 120 side of the Ps port 111 in the axial direction, so that a flow passage cross-sectional area A103 on an upstream side of the flow passage C102 is larger than the flow passage cross-sectional area A102 on a downstream side of the flow passage C101 (A102<A103) and the flow passage cross-sectional area tends to increase toward the downstream side (dA>0).

In addition, the flow passage cross-sectional area of the flow passage C101 continuously increases toward the downstream side. In addition, the flow passage cross-sectional area of the flow passage C102 also continuously increases toward the downstream side, but since the outer peripheral surface 51d of the CS valve body 51 extends linearly in the axial direction with respect to the tapered surface forming the CS valve seat 140a, an increase amount of the flow passage cross-sectional area is larger than that of the flow passage C101.

In addition, the flow passage C103 corresponds to a space of a radially outer portion of the first recessed portion 110a and communicates with the opening having a stepped shape on the valve chamber 120 side of the Ps port 111 at the inner peripheral surface 110d and the bottom surface 110e of the first recessed portion 110a.

In addition, as shown in FIG. 6, the tapered surface forming the CS valve seat 140a extends over an entire stroke region of the contact portion 51a of the CS valve body 51.

According to this configuration, in the capacity control valve V2 of the second embodiment, the flow passage on the downstream side of the CS valve 50 is provided with the flow passages C101 and C102 as increase regions where the flow passage cross-sectional area tends to increase toward the downstream side (dA>0). When the fluid passing through the CS valve 50 flows at a supersonic speed (M>1), the fluid passing through the flow passages C101 and C102 increases in flow speed and decreases in pressure, and a force in the valve opening direction acts on the CS valve body 51. Accordingly, the influence of the pressure of the fluid on the upstream side of the CS valve 50, in the present embodiment, the influence of the discharge pressure Pd on the downstream pressure of the CS valve 50 can be suppressed. As described above, the influence of the discharge pressure Pd on a force due to a back pressure acting on the CS valve body 51 can be suppressed, a variation in the stroke of the CS valve body 51 with respect to an electric current value input to the solenoid 80 can be suppressed, and the opening degree of the CS valve 50 can be accurately adjusted.

In addition, when the fluid passing through the CS valve 50 flows at a subsonic speed (M<1), the fluid passing through the flow passages C101 and C102 decreases in flow speed and increases in pressure, and a force in the valve closing direction acts on the CS valve body 51. In addition, a force due to a back pressure acting on the CS valve body 51 which is affected by the discharge pressure Pd can be further increased. For this reason, the valve closing characteristic of the CS valve 50 can be improved, and the CS valve 50 can be closed with a small electric current value.

As described above, the flow passage on the downstream side of the CS valve 50 is provided with the flow passages C101 and C102 that are increase regions where the flow passage cross-sectional area tends to increase toward the downstream side (dA>0), and the downstream pressure of the CS valve 50 is appropriately controlled according to the flow speed of the fluid passing through the CS valve 50, so that the controllability of the CS valve 50 can be improved.

In addition, since the CS valve seat 140a forming the flow passages C101 and C102 as increase regions is formed of the tapered surface extending linearly to the position at which the radially outer portion of the tapered surface overlaps the opening on the valve chamber 120 side of the Ps port 111 in the axial direction, the fluid is easily guided into the Ps port 111 while changing the flow speed or pressure of the fluid in an accelerating manner. Accordingly, the flow of the fluid in the flow passage on the downstream side of the CS valve 50 can be stabilized to eliminate stagnation, and the downstream pressure of the CS valve 50, namely, the pressure of the fluid in the valve chamber 120 can be more stabilized.

In addition, since the CS valve seat 140a is formed in the valve seat member 140 that is separate from the valve housing 110, the accuracy of processing of the tapered surface for forming an increase region can be improved. Further, the tapered surface forming the CS valve seat 140a can be extended to the vicinity of the Ps port 111.

Incidentally, in the second embodiment, the valve seat member 140 may not have the flat surface 140c, and the tapered surface forming the CS valve seat 140a may be continuous with the outer peripheral surface of the valve seat member 140. In addition, in this case, since the radially outer end of the tapered surface forming the CS valve seat 140a is continuous with the opening on the valve chamber 120 side of the Ps port 111, the step portion 114 having an annular shape may not be formed in the inner peripheral surface of the valve housing 110.

The embodiments of the present invention have been described above with reference to the drawings; however, the specific configurations are not limited to the embodiments, and the present invention also includes changes or additions that are made without departing from the scope of the present invention.

For example, in the embodiments, the valve housing and the valve seat member have been described as being made of a metallic material; however, the present invention is not limited thereto, and the valve seat member may be made of a resin material, etc. as long as the hardness of the valve seat member is harder than a hardness of a flow passage inner side of the valve housing. In addition, also in this case, it is preferable that the valve seat member is made of a material which is different from that of the valve body.

In addition, the contact portion of the CS valve body that comes into contact with and separates from the CS valve seat may not be formed in a curved shape in a cross-sectional view.

In addition, the tapered surface forming the CS valve seat is not limited to having a linear shape and may have an arc shape.

In addition, the increase region is not limited to a mode where the flow passage cross-sectional area continuously increases due to the tapered surface, and may show an increase tendency where the flow passage cross-sectional area increases in a stepwise manner due to a stepped surface.

In addition, in the first and second embodiments, both the flow passages C1 and C2 or both the flow passages C101 and C102 that are continuous on the downstream side of the CS valve 50 have been described as forming increase regions, but the present invention is not limited thereto, and for example, either of the upstream flow passages C1 and C101 and the downstream flow passages C2 and C102 may form increase regions.

In addition, in the capacity control valves of the embodiments, the CS valve as a poppet valve has been described as an example, but the poppet valve may be a DC valve that opens and closes the flow passage between a Pd port as an inlet port and the Pc port as an outlet port.

REFERENCE SIGNS LIST

9 Fixed orifice
10 Valve housing
10a Recessed portion
10b Receiving portion
10c Guide hole
10d Recessed portion
10e Inner peripheral surface
11 Ps port (outlet port)
20 Valve chamber
21 Through-hole
30 Pressure-actuated valve
40 Valve seat member
40a CS valve seat (valve seat)
40b Through-hole (through-flow passage, inlet port)
40c Flat surface
50 CS valve (poppet valve)
51 CS valve body (valve body)
51a Contact portion
51d Outer peripheral surface
80 Solenoid (drive source)
110 Valve housing
110a First recessed portion
110b Second recessed portion
110d Inner peripheral surface
110e Bottom surface
110f Inner peripheral surface
111 Ps port (outlet port)
114 Step portion
120 Valve chamber
140 Valve seat member
140a CS valve seat (valve seat)
140b Through-hole (through-flow passage, inlet port)
140c Flat surface
140d Flange portion
C1, C2 Flow passage (increase region, flow passage on downstream side)
C101, C102 Flow passage (increase region, flow passage on downstream side)
C103 Flow passage (flow passage on downstream side)
S Space
V1, V2 Capacity control valve (valve)

The invention claimed is:

1. A fluid control valve, comprising:
a valve housing provided with an inlet port and an outlet port;
a valve body configured to be driven by a drive source;
a spring configured to urge the valve body in a direction opposite a direction of driving by the drive source; and
a valve seat formed at an edge of a through-flow passage the valve body and the valve seat cooperatively forming a poppet valve, the valve being configured to control a flow rate in accordance with a movement of the valve body, wherein a flow passage on a downstream side of the poppet valve is provided with an increase region where a flow passage cross-sectional area tends to increase toward the downstream side, the valve body has a surface portion which partially defines the flow passage of the increase region, the curved shape portion is brought into contact with and separated from the valve seat, the valve seat is formed in a valve seat member that is formed separately from the valve housing, the valve seat member is inserted into a recess portion of the valve housing in a valve opening direction of the valve body and press-fitted to the valve housing, and the valve body has an axial end surface which is configured to come into contact with the valve seat and formed by a curved surface bulged out toward the flow passage without having a recess portion, and an outer peripheral surface directly connected to the axial end surface to extend in an axial direction and partially forming the surface portion.

2. The fluid control valve according to claim 1, wherein the flow passage cross-sectional area of the increase region continuously increases.

3. The fluid control valve according to claim 2, wherein the valve seat has a tilted shape in a cross-sectional view.

4. The fluid control valve according to claim 3, wherein the tilted shape is a linear shape.

5. The fluid control valve according to claim 1, wherein the valve seat has a tilted shape in a cross-sectional view.

6. The fluid control valve according to claim 5, wherein the tilted shape is a linear shape.

7. The fluid control valve according to claim 6, wherein a tilted surface forming the valve seat is continuous with an opening of the outlet port.

8. The fluid control valve according to claim 5, wherein a tilted surface forming the valve seat is continuous with an opening of the outlet port.

* * * * *